US007283149B2

(12) United States Patent
Nomura et al.

(10) Patent No.: US 7,283,149 B2
(45) Date of Patent: Oct. 16, 2007

(54) OPTICAL HEAD AND IMAGE FORMING APPARATUS EMPLOYING THE SAME

(75) Inventors: Yujiro Nomura, Nagano-Ken (JP); Mitsukazu Kurose, Nagano-Ken (JP); Kiyoshi Tsujino, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 844 days.

(21) Appl. No.: 10/448,433

(22) Filed: May 30, 2003

(65) Prior Publication Data

US 2004/0075758 A1 Apr. 22, 2004

(30) Foreign Application Priority Data

May 31, 2002 (JP) ............................ 2002-158866
May 31, 2002 (JP) ............................ 2002-158867

(51) Int. Cl.
*B41J 2/47* (2006.01)
*B41J 15/14* (2006.01)

(52) U.S. Cl. ...................................... 347/240; 347/242

(58) Field of Classification Search ................ 347/240, 347/242

See application file for complete search history.

(56) References Cited

U.S. PATENT DOCUMENTS 6,072,517 A 6/2000 Fork et al.
6,396,530 B1 * 5/2002 Erwin et al. ................ 347/240
6,894,712 B2 * 5/2005 Ishikawa et al. ............ 347/239
6,930,699 B2 * 8/2005 Yamada et al. ............. 347/232
2001/0033323 A1 * 10/2001 Otose et al. ................ 347/238
2003/0169325 A1 * 9/2003 Takeyama et al. .......... 347/116
2003/0210289 A1 * 11/2003 Yoshiyama et al. ............ 347/7

FOREIGN PATENT DOCUMENTS

EP 0917212 A1 5/1999
JP 61-182966 A 8/1986
JP 64-026468 A 1/1989
JP 09-323443 12/1997
JP 11-129541 A 5/1999
JP 2000-238332 9/2000

OTHER PUBLICATIONS

Japanese Abstract No. 59134985, dated Aug. 2, 1984.
Japanese Abstract No. 09323443, dated Dec. 16, 1997.
Japanese Abstract No. 2000238332, dated Sep. 5, 2000.

* cited by examiner

*Primary Examiner*—An H. Do
*Assistant Examiner*—Sarah Al-Hashimi
(74) *Attorney, Agent, or Firm*—Sughrue Mion, PLLC

(57) ABSTRACT

Image data is inputted from a data processing device 23 into storage means 24 formed on a light-emitting element (yellow) line head 28 so that light emitting elements in one line 28*a* expose pixels on an image carrier in response to output signal from a shift resistor 24*a*. As the image carrier is moved in the direction of X to bring said pixels to reach the position corresponding to light emitting elements in the next line 28*b*, the image data is transmitted to a shift resistor 24*b* so that the shift resistor 24*b* outputs the image data to light emitting elements in the line 28*b*, whereby the pixels are exposed to light again. The movement of the image carrier and the transmission of the image data to the respective shift resistors are sequentially conducted, thereby conducting multiple exposure of each same pixel.

1 Claim, 16 Drawing Sheets

X
Y
28
28a
28b
28c
28d
28e
24
24a
24b
24c
24d
24e
Shift Resistor
Shift Resistor
Shift Resistor
Shift Resistor
Shift Resistor
23a
23
Data Processing Means 22
21
Host Computer
23
Data Processing Means
24
Storage Means
25
Storage Means
26
Storage Means
27
Storage Means
28
Light-emitting Element (Yellow) Line Head
29
Light-emitting Element (Magenta) Line Head
30
Light-emitting Element (Cyan) Line Head
31
Light-emitting Element (Black) Line Head 28x
24
23
Data Processing Means
Shift Resistor
24f
24g
24h
24i
24j
24k
24ℓ
24m
24n
28f
28h
28j
28ℓ
28m X
Y
Shift Resistor 24p
Shift Resistor 24q
Shift Resistor 24r
Shift Resistor 24s
Shift Resistor 24t
28p
28q
28r
28s
28t
28y
38a
38b
38c
38d
38e
38f
38g
38h
38i
38j
38k
36a
36b
36c
36d
36e
35a
35b
Line Selector
37a
37b
37c
37d
37e
34
23
Data Processing Means

| Bit Data No. | Bit Data | Gradation Level |
|---|---|---|
| 1 | 0 0 0 0 0 0 0 0 | 0 |
| 2 | 0 0 0 0 0 1 0 0 | 4 |
| 3 | 0 0 0 0 1 0 0 0 | 8 |
| 4 | 0 0 0 1 0 0 0 0 | 16 |
| 5 | 0 0 1 0 0 0 0 0 | 32 |
| 6 | 0 1 0 0 0 0 0 0 | 64 |
| 7 | 1 0 0 0 0 0 0 0 | 128 |
| 8 | 1 1 1 1 1 1 1 1 | 255 |

70
74
Gradation Data Signal
75
Reference Clock Signal
76
Select Signal
71a
Gradation Data Memory
71b
Gradation Data Memory
72
Counter
73a
Comparator
73b
Comparator
38a
38b
Za
Light Emitting Part
Zb
Light Emitting Part
37a 15
16
12
1
11
13
14

OPTICAL HEAD AND IMAGE FORMING APPARATUS EMPLOYING THE SAME

BACKGROUND OF THE INVENTION

The present invention relates to an optical head of multi-exposure type capable of giving gradation in which the circuit structure is simplified and the emission control is speeded up for exposing pixels on an image carrier to light and also relates to an image forming apparatus employing the same.

In conventional image forming apparatus in which a latent image is written on an image carrier, it is common practice to employ a light emitting diode (LED) array as writing means. In case of employing a light emitting elements such as LEDs, it is required to pay attention to the relation between the luminance (amount of light) and the life duration of each light emitting element. That is, the life duration can be increased by reducing the luminance of the light emitting element. In this case, however, there is a problem that the amount of light for exposure is insufficient to form image. When the luminance of the light emitting element is increased, enough amount of light for exposure for forming image is obtained. In this case, however, there is a problem that the life duration is shortened.

For this, the development of material for obtaining light emitting elements capable of providing large luminance and having long life duration has been encouraged. However, in the present state of affairs, it is too expensive to achieve the practical use. In this connection, a line head (optical head) of multi-exposure type in which each pixel is exposed to light by a plurality of light emitting elements. As examples of such line head of multi-exposure type, (1) Japanese Patent Unexamined Publication No. S61-182966 discloses a recording array head on which light recording elements are aligned in a plurality of lines relative to the rotational direction of a photosensitive drum. Image data are formed again and again on a same pixel by shifting the light recording elements in the direction of the lines while moving the photosensitive drum. The example (1) has an advantage that high-speed image formation is achieved even using light recording elements with low light-emitting output.

(2) Japanese Patent Unexamined Publication No. S64-26468 discloses an EL element panel composed of a group of EL elements of 20 dots (vertical)×640 dots (horizontal). The EL element group is driven for each line at the same speed of the moving speed of a photoreceptor. Accordingly, each pixel is irradiated by light of which amount is twentyfold of the amount of light of each EL element. Also in this example, the amount of light for exposure per pixel is increased, thereby achieving the speed-up of the image formation. In addition, (3) Japanese Patent Unexamined Publication No. H11-129541 discloses a print head on which LEDs are aligned in a plurality of lines. Multiple exposure is made on each pixel by moving the print head in the main scanning direction. In this example, since the multiple exposure is conducted, variations in amount of light among the respective LEDs can be equalized, thereby improving the image quality. (4) Japanese Patent Unexamined Publication No. 2000-260411 discloses an optical printer head on which plural lines of LED array chips are aligned. The gradation of each pixel can be changed among three levels by turning ON or OFF the LED array chips on each line.

The techniques disclosed in the aforementioned (1), (2) relate to monochrome image formation and have a problem that the gradation control for neutral density is impossible. Since the technique disclosed in the aforementioned (3) is of a serial type that the line head is driven, there is a problem of complexity of the driving mechanism. Since the technique disclosed in the aforementioned (4) is structured such that the LED array chips on each line are turned ON or OFF, there is a problem of complexity of the control circuit. Since the number of light emitting elements in the line head of multi-exposure type are greater than that of a line head of normal exposure type and it is necessary to control the light emitting elements synchronously with the movement of the photoreceptor, there is a problem of complexity of the control circuit for conducting the data processing and it is difficult to speed up the emission control.

Especially, in case that a line head (optical head) of multi-exposure type is employed for color image formation, the amount of data to be processed must be severalfold of that in the case of ON-OFF control because the gradation control for each pixel is sometimes required. This makes the speed-up of emission control further difficult. In case of a line head of multi-exposure type, it is required to send a large quantity of data formed by a data processor to the line head. Accordingly, the number of wires between the line head and the body of image forming apparatus is increased and it is necessary to use an interface capable of supporting the high-speed processing, thus increasing the cost.

SUMMARY OF THE INVENTION

The present invention was made in view of the aforementioned problems of conventional techniques and the object of the present invention is to provide a optical head of multi-exposure type capable of giving gradation in which the circuit structure is simplified and the emission control is speeded up for exposing pixels on an image carrier to light and to provide an image forming apparatus employing the same.

An optical head of a first aspect of the present invention achieving the aforementioned object comprises: light emitting elements which are aligned in a plurality of lines, extending in the main scanning direction of an image carrier and being arranged in parallel with each other in the sub scanning direction of the image carrier, so that said light emitting elements are arranged in two-dimensional array; and storage means for storing image data and outputting the image data to said light emitting elements, wherein said light emitting elements and said storage means are mounted together, said optical head being characterized in that pixels on said image carrier are exposed by the light emitting elements aligned in one line and exposed again by the light emitting elements aligned in the next line after the movement of said image carrier, and in the same manner, said pixels are sequentially exposed by the light emitting elements in another line after the movement of said image carrier so as to achieve multiple exposure of the pixels, and characterized by being capable of exposing pixels with gradational outputs.

The optical head of the first aspect is characterized in that light emitting elements on the respective lines which are aligned to expose a same pixel repeatedly expose said same pixel with the same amount of light. The light emitting elements have the following features. That is, (1) the interval in the sub scanning direction between spot positions formed on the image carrier by the light emitting elements is an integral multiple of the pixel pitch in the sub scanning direction; (2) the light emitting elements are controlled by a driving circuit according to the active matrix method; (3) the amount of light of the light emitting elements are controlled in the PWM method; (4) the amount of light of the light emitting elements are controlled in the intensity modulation method; (5) each of said light emitting elements comprises an organic EL.

In the optical head of the first aspect, the storage means have the following features. That is, (1) each of the storage means comprises a TFT; (2) the storage means are arranged to correspond to the lines of the light emitting elements, respectively and are designed to transport image data, hold the image data, and output the image data to the light emitting elements; (3) the storage means are formed on a same substrate on which the light emitting elements are formed; and (4) there are lines of pixels to be exposed and lines of pixels not to be exposed on said image carrier, the light emitting elements on the respective lines are arranged to correspond to the lines of pixels to be exposed, respectively, said storage means are arranged to correspond to both the lines of pixels to be exposed and the lines of pixels not to be exposed, respectively, and the storage means corresponding to the lines of pixels not to be exposed do not output said image data.

An image forming apparatus of a first aspect of the present invention achieving the aforementioned object is of a tandem type and comprises at least two image forming stations each having an image carrier and further having a charging means, an exposure head, a developing means, and a transfer means which are arranged around said image carrier and forming a color image by passing a transfer medium through the respective stations, wherein said exposure head comprises: light emitting elements which are aligned in a plurality of lines, extending in the main scanning direction of an image carrier and being arranged in parallel with each other in the sub scanning direction of the image carrier, so that said light emitting elements are arranged in two-dimensional array; and storage means for storing image data and outputting the image data to said light emitting elements and said exposure head is an optical head on which said light emitting elements and said storage means are mounted together, said optical head being characterized in that pixels on said image carrier are exposed by the light emitting elements aligned in one line and exposed again by the light emitting elements aligned in the next line after the movement of said image carrier, and in the same manner, said pixels are sequentially exposed by the light emitting elements on another line after the movement of said image carrier so as to achieve multiple exposure of the pixels, and characterized by being capable of exposing pixels with gradational outputs. The image forming apparatus of the first aspect is characterized in that an optical head having any one of the aforementioned features is employed as the optical head.

In the optical head of the first aspect of the present invention, the storage means are provided on the line head together with the light emitting elements. Therefore, the data amount to be sent from the image forming apparatus to the line head can be reduced, thereby reducing the number of wires between the image forming apparatus and the line head.

The storage means of the present invention are formed on the same substrate on which the light emitting elements are formed. Therefore, the light emitting elements and the storage means can be manufactured together. The necessity of preparing the light emitting elements and the storage means on separate chips can be eliminated, thereby reducing the manufacturing cost. Further, each storage means comprises a TFT in the present invention. Since the light emitting elements and storage elements are formed on the single substrate such as a glass substrate having high dimensional stability, improvement in accuracy of aiming light from each light emitting element to each pixel on the image carrier is achieved.

In the optical head of the first aspect of the present invention, once data only for one line, i.e. the first line, is produced, the image data for the first line is stored in the storage means (shift resistor) and are transmitted among the storage means, where by the operations of all light emitting elements of the optical head can be controlled. Since it is not required to produce data for all light emitting elements of the optical head, the structure of circuit can be simplified and the data processing can be conducted at high speed.

Further, in the optical head of the first aspect of the present invention, storage means for pixel line and lines of light emitting elements can be arranged in one-on-one relation. Therefore, the timing for transmitting image data stored in a storage means to the next storage means and the timing for making light emitting elements in the line to emit light on the basis on the image data for pixel line stored in the storage means can be synchronized, thereby simplifying the circuit structure and speeding up the operation of the light emitting elements.

Furthermore, in the optical head of the first aspect of the present invention, the light emitting elements are controlled in the active matrix method. Accordingly, the light emitting elements can be maintained to keep emitting light by means of condensers and transistors arranged around the light emitting elements. Therefore, the light emitting elements remain to emit light even during the transmission of image data from a storage means to the next storage means, thereby exposing pixels with high luminance. In addition, in the optical head of the first aspect of the present invention, the amount of light emitted from the light emitting elements is controlled in the PWM method. Since the amount of exposure can be changed by ON/OFF of the light emitting elements, the circuit structure can be simplified.

Moreover, in the optical head of the first aspect of the present invention, the amount of light emitted from the light emitting elements is changed in the intensify modulation method. Therefore, it is not required to control the ON/OFF of the light emitting elements at a high speed. Even when the speed of response of the light emitting elements is slow, the amount of exposure can be changed at a high speed. In addition, in the optical head of the first aspect of the present invention, each light emitting element is composed of an organic EL. Therefore, the light emitting elements can be easily formed on a glass substrate, thereby achieving lower price.

An optical head of a second aspect of the present invention achieving the aforementioned object comprises: light emitting elements which are aligned in a plurality of lines, extending in the main scanning direction of an image carrier and being arranged in parallel with each other in the sub scanning direction of the image carrier, so that said light emitting elements are arranged in two-dimensional zigzag fashion; and storage means for storing image data and outputting the image data to said light emitting elements, said optical head being characterized in that pixels on said image carrier are exposed by the light emitting elements aligned in one line and exposed again by the light emitting elements aligned in the next line after the movement of said image carrier, and in the same manner, said pixels are sequentially exposed by the light emitting elements on another line after the movement of said image carrier so as to achieve multiple exposure of the pixels, and characterized by being capable of exposing pixels with gradational outputs.

The optical head of the second aspect is characterized in that light emitting elements on the respective lines which are aligned to expose a same pixel repeatedly expose said same pixel with the same amount of light. The light emitting elements arranged in two-dimensional zigzag fashion have the following features. That is, (1) the interval in the sub scanning direction between spot positions formed on the image carrier by the light emitting elements is an integral multiple of the pixel pitch in the sub scanning direction; (2) the light emitting elements are controlled by a driving circuit according to the active matrix method; (3) the amount of light of the light emitting elements are controlled in the PWM method; (4) the amount of light of the light emitting elements are controlled in the intensity modulation method; (5) each of said light emitting elements comprises an organic EL.

In the optical head of the second aspect, pixels to be exposed by light emitting elements and pixels not to be exposed by light emitting elements are arranged in the zigzag fashion in said sub scanning direction on said image carrier, and the storage means comprise first storage means each of which outputs image data to the light emitting elements in the corresponding line and second storage means each of which transfer the image data to the next first storage means without outputting the image data to the light emitting elements.

In the optical head of the second aspect, the storage means for outputting the light emitting elements arranged in two-dimensional zigzag fashion have the following features. That is, (1) the storage means are formed on a same substrate on which the light emitting elements are formed; (2) each of the storage means comprises a TFT; and (3) the storage means are arranged to correspond to the lines of the light emitting elements, respectively and are designed to transport image data, hold the image data, and output the image data to the light emitting elements.

An image forming apparatus of a second aspect of the present invention achieving the aforementioned object is of a tandem type and comprises at least two image forming stations each having an image carrier and further having a charging means, an exposure head, a developing means, and a transfer means which are arranged around said image carrier and forming a color image by passing a transfer medium through the respective stations, wherein said exposure head comprises: light emitting elements which are aligned in a plurality of lines, extending in the main scanning direction of an image carrier and being arranged in parallel with each other in the sub scanning direction of the image carrier, so that said light emitting elements are arranged in two-dimensional zigzag fashion; and storage means for storing image data and outputting the image data to said light emitting elements and said exposure head is an optical head on which said light emitting elements and said storage means are mounted together, said optical head being characterized in that pixels on said image carrier are exposed by the light emitting elements aligned in one line and exposed again by the light emitting elements aligned in the next line after the movement of said image carrier, and in the same manner, said pixels are sequentially exposed by the light emitting elements on another line after the movement of said image carrier so as to achieve multiple exposure of the pixels, and characterized by being capable of exposing pixels with gradational outputs. The image forming apparatus of the second aspect is characterized in that light emitting elements and storage means having any one of the aforementioned features of the optical head of the second aspect are employed.

In the optical head of the second aspect of the present invention in which the light emitting elements are arranged in the two-dimensional zigzag fashion in said sub scanning direction on said image carrier, once data only for one line, i.e. the first line, is produced, the image data for the first line is stored in the storage means (shift resistor) and are transmitted among the storage means, whereby the operations of all light emitting elements of the optical head can be controlled. Since it is not required to produce data for all light emitting elements of the optical head, the structure of circuit can be simplified and the data processing can be conducted at high speed. In addition, the data amount to be sent from the image forming apparatus to the optical head can be reduced, thereby reducing the number of wires between the image forming apparatus and the optical head.

Further, in the optical head of the second aspect of the present invention, the light emitting elements arranged in the zigzag fashion are controlled in the active matrix method. Accordingly, the light emitting elements can be maintained to keep emitting light by means of condensers and transistors arranged around the light emitting elements. Therefore, the light emitting elements remain to emit light even during the transmission of image data from a storage means to the next storage means, thereby exposing pixels with high luminance. In addition, in the optical head of the second aspect of the present invention, the amount of light emitted from the light emitting elements arranged in the zigzag fashion is controlled in the PWM method. Since the amount of exposure can be changed by ON/OFF of the light emitting elements, the circuit structure can be simplified.

Furthermore, in the optical head of the second aspect of the present invention, the amount of light emitted from the light emitting elements arranged in the zigzag fashion is controlled in the intensify modulation method. Therefore, it is not required to control the ON/OFF of the light emitting elements at a high speed. Even when the speed of response of the light emitting elements is slow, the amount of exposure can be changed at a high speed. In addition, in the optical head of the second aspect of the present invention, each of the light emitting elements arranged in the zigzag fashion is composed of an organic EL. Therefore, the light emitting elements can be easily formed on a glass substrate, thereby achieving lower price.

In the optical head of the second aspect of the present invention, the storage means are provided on the optical head together with the light emitting elements. Therefore, the data amount to be sent from the image forming apparatus to the line head can be reduced, thereby reducing the number of wires between the image forming apparatus and the line head. In addition, the storage means of the optical head of the second aspect according to the present invention are formed on the same substrate on which the light emitting elements arranged in the zigzag fashion are formed. Therefore, the light emitting elements and the storage means can be manufactured together. The necessity of preparing the light emitting elements and the storage means on separate chips can be eliminated, thereby reducing the manufacturing cost.

Further, in the optical head of the second aspect of the present invention, said substrate is made of glass and each storage means comprises a TFT. Since the light emitting elements and storage elements are formed on the single substrate such as a glass substrate having high dimensional stability, improvement in accuracy of aiming light from each light emitting element to each pixel on the image carrier is achieved. In addition, in the optical head of the second aspect of the present invention, storage means for pixel line and lines of light emitting elements can be arranged in one-on-one relation. Therefore, the timing for transmitting image data stored in a storage means to the next storage means and the timing for making light emitting elements in the line to emit light on the basis on the image data for pixel line stored in the storage means can be synchronized, thereby simplifying the circuit structure and speeding up the operation of the light emitting elements.

An image forming apparatus of a third aspect of the present invention achieving the aforementioned object comprises: a plurality of lines each of which is composed of a plurality of light emitting elements and which are arranged in parallel with each other in the sub scanning direction of an image carrier so that said light emitting elements are arranged in two-dimensional array, wherein pixels on said image carrier are exposed by the light emitting elements aligned in one line and exposed again by the light emitting elements aligned in the next line after the movement of said image carrier, and in the same manner, said pixels are sequentially exposed by the light emitting elements in another line after the movement of said image carrier so as to achieve multiple exposure of the pixels, further comprises a control means for controlling said light emitting elements on the respective lines which are aligned to expose same pixel such that said light emitting elements expose said same pixel with the same amount of light, and is characterized by being capable of exposing pixels with gradational outputs prepared by said control means.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 2:
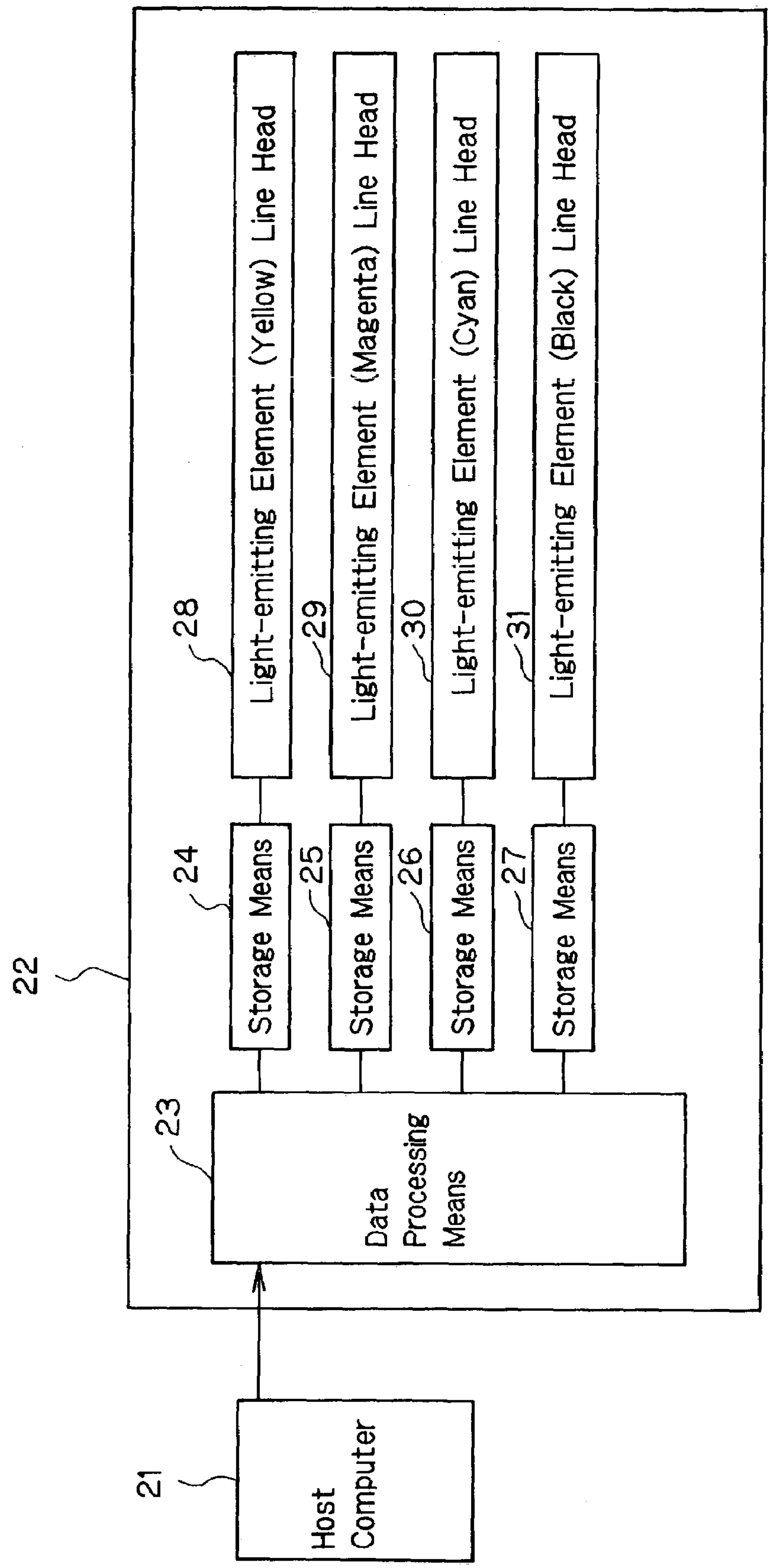
FIG. 2 is a block diagram showing the entire structure of the apparatus of FIG. 1.

The present invention will be described in the below with reference to the drawings. FIG. 2 is a block diagram showing the schematic structure of an optical head to be employed in an image forming apparatus of the present invention. In FIG. 2, a host computer 21 produce printing data and sends the printing data to a control unit 22 of the image forming apparatus. The control unit 22 of the image forming apparatus comprises a data processing means 23, storage means 24-27, and light-emitting element line heads (optical heads) 28-31 arranged corresponding to the aforementioned storage means 24-27. The light-emitting element line heads 28-31 correspond to four colors, i.e. yellow, magenta, cyan, and black, respectively, to form color images on a photoreceptor. The storage means 24-27 store image data corresponding to light-emitting element line heads 28-31 for the respective colors.

The data processing means 23 carries out processes such as color separation, gradation treatment, bit-mapping of image data, and correction of color registration error. The data processing means 23 outputs image data for each line to each storage means 24-27. Each light-emitting element line head 28-31 has a plurality of light emitting element lines arranged therein and is structured to conduct multiple exposure in which light emitting elements on the respective lines emit light to a same pixel. Therefore, each storage means 24-27 outputs image data for plural lines to each light-emitting element line head 28-31.

Figure 1:
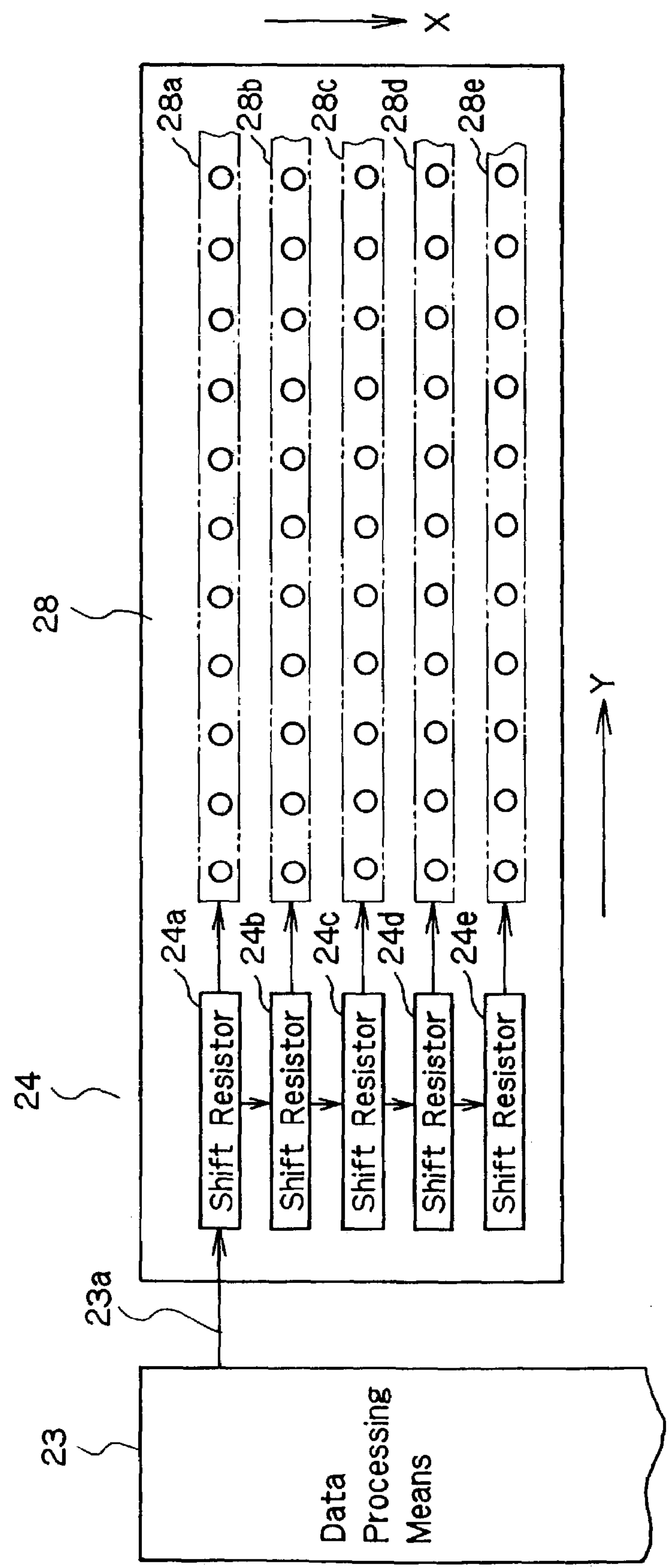
FIG. 1 is a block diagram partially showing an example of an image forming apparatus according to an embodiment of the present invention.

FIG. 1 is a block diagram partially showing the structure shown in FIG. 2. Shown in FIG. 1 are the light-emitting element (yellow) line head 28 and the storage means 24 corresponding to the line head 28. In the example shown in FIG. 1, the line head 28 has a line 28*a* provided with a plurality of light-emitting elements 32. In this example, five lines 28*a*-28*e* are arranged in the sub scanning direction X of an image carrier and each line has the same number of light-emitting elements. The storage means 24 comprise shift resistors 24*a*-24*e* to correspond to the lines 28*a*-28*e* composed of the light-emitting elements, respectively. In FIG. 1, the direction of arrow X indicates the moving direction (sub scanning direction) of a photosensitive drum (image carrier) and the direction of arrow Y indicates the main scanning direction. Now, the operation of the block diagram shown in FIG. 1 will be described. As the image data is inputted from the data processor 23 into the storage means 24, the shift resistor 24a outputs image data to the light emitting elements in the first line 28a so that the light emitting elements work, whereby pixels on the image carrier are exposed to a predetermined amount of light.

The image carrier is driven to rotate in the direction of arrow X in such a manner that the pixels exposed by the light emitting elements of the first line 28a reach a position corresponding to the light emitting elements arranged in the next line 28b. At the same time, the image data inputted in the shift resistor 24a are transmitted to the shift resistor 24b. The shift resistor 24b outputs the image data to the light emitting elements of the line 28b so that the light emitting elements work. Accordingly, the pixels previously exposed by the light emitting elements of the line 28a are exposed again by the light emitting elements of the line 28b with the equal amount of light.

In this manner, the image data is sequentially transmitted from the previous shift resistor to the next shift resistor while the image carrier is moved in the direction of arrow X, whereby each same pixel is exposed again and again by light emitting elements in different lines. Consequently, in the example of FIG. 1, the respective pixels are exposed to light of which amount is quintuple of that of a single light emitting element, thereby quickly obtaining the amount of light required to expose each pixel. The number of the lines in which the light emitting elements are aligned in the sub scanning direction can be suitably selected, that is, the number for multiplying the amount of light for exposure to be obtained by a single light emitting element can be suitably selected, if necessary.

In case of gradation control for neutral density is conducted by the structure of FIG. 1, assuming that the predetermined luminance is 1, image data for luminance of 0.1 are inputted from the data processor 23 to the shift resistor 24a. As mentioned above, by transmitting the image data sequentially to the shift resistors 24a-24e to output the image data to the light emitting elements while moving the image carrier, the luminance of each pixel becomes $0.1\times5=0.5$, providing a neutral density. In this manner, output for gradation when exposing pixels can be obtained. In the present invention, once the data processing means 23 of the image forming apparatus produces data only for one line, the image data for the first line is stored in the storage means (shift resistor) and are transmitted among the storage means, whereby the operations of all light emitting elements of the line head can be controlled.

Since the data processing means is not required to produce data for all light emitting elements of the line head, the structure of circuit can be simplified and the data processing can be conducted at high speed. In the example of FIG. 1, the shift resistors 24a-24e functioning as storage means are mounted on the line head 28 as well as the light emitting elements. Therefore, the amount of data to be transmitted from the data processing means (control means) to the line head can be reduced, all that is required between the data processing means 23 and the line head is only a single wiring 23a.

In the example of FIG. 1, the shift resistors 24a-24e are formed on a same substrate on which the light emitting elements are formed. Therefore, the light emitting elements and the storage means can be manufactured together. The necessity of preparing the light emitting elements and the storage means on separate chips can be eliminated, thereby reducing the manufacturing cost. Further, in the example of FIG. 1, a glass is used as the aforementioned substrate so that the storage means are composed of Thin Film Transistors (TFTs). There are various methods of making the TFT. For example, silicon oxide is first deposited into a layer on a glass substrate and amorphous silicon is then deposited into a layer thereon. The amorphous silicon layer is exposed to excimer laser beam for crystallization, thus forming a polysilicon layer as a channel.

After patterning the polysilicon layer, a gate insulating layer is formed and further a gate electrode is formed of tantalum nitride. Subsequently, source/drain regions for N-channel TFT are formed by ion implantation of phosphorous and source/drain regions for P-channel TFT are formed by ion implantation of boron. After impurities of ion implantation is activated, a first layer insulating film is formed, first contact holes are formed, source lines are formed, a second layer insulating film is formed, second contact holes are formed and metallic pixel electrodes are formed, thereby completing the array of TFT (for example, see "Polymer Organic EL Display" presented at the 8$^{th}$ Electronic Display Forum (Apr. 18, 2001)).

The metallic pixel electrode is made of metal such as Mg, Ag, Al, and Li and functions as a cathode for the organic EL emitter and also as a reflection layer for the organic EL emitter. Since the glass substrate having high dimensional stability is structured and all of light emitting elements and storage elements are formed on the single substrate, improvement in accuracy of aiming light from each light emitting element to each pixel on the image carrier is achieved.

Figure 3:
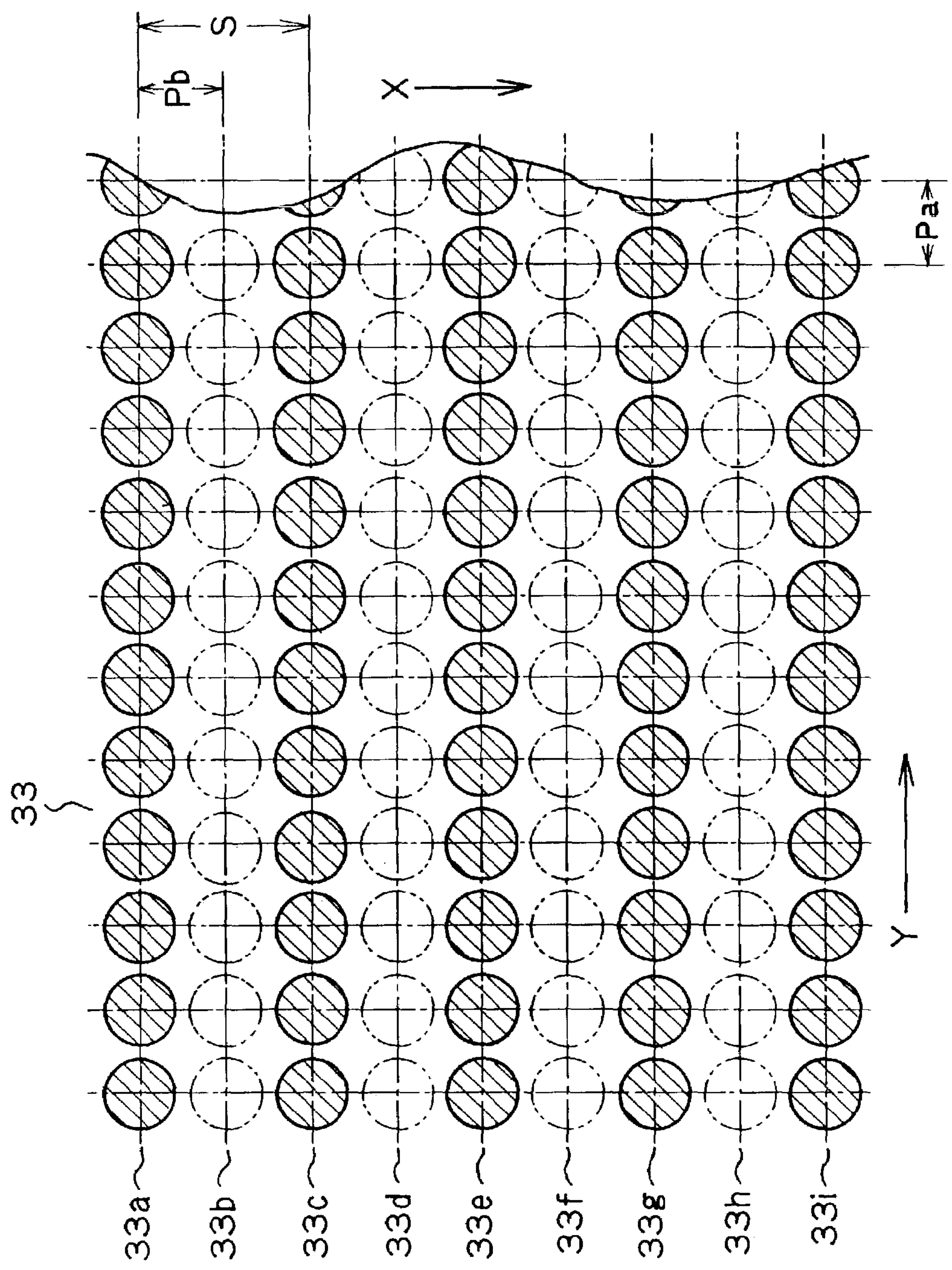
FIG. 3 is an explanatory diagram showing an image forming apparatus according to another embodiment of the present invention.

FIG. 3 shows the structure of an optical head according to another embodiment of the present invention and is an explanatory diagram of spot positions 33 to be formed on the image carrier. Hatched portions in FIG. 3 are spot positions. Pixels at these positions are exposed to light. Positions indicated by chain double-dashed lines are pixels not to be exposed to light. "Pa" indicates a pixel pitch in the main scanning direction and "Pb" indicates a pixel pitch in the sub scanning direction. "S" indicates a pitch between spot positions (spot position pitch) in the sub scanning direction which is an integer multiple of the pixel pitch. In this example, the pitch is twice as the pixel pitch. As for the spot positions 33 shown in FIG. 3, spots are formed in each of lines 33a, 33c, 33e, 33g, and 33i on the image carrier by light emitted from the light emitting elements, thereby exposing pixels. In each of lines 33b, 33d, 33f, and 33h, spots are not formed on the image carrier by light emitted from the light emitting elements.

Figure 4:
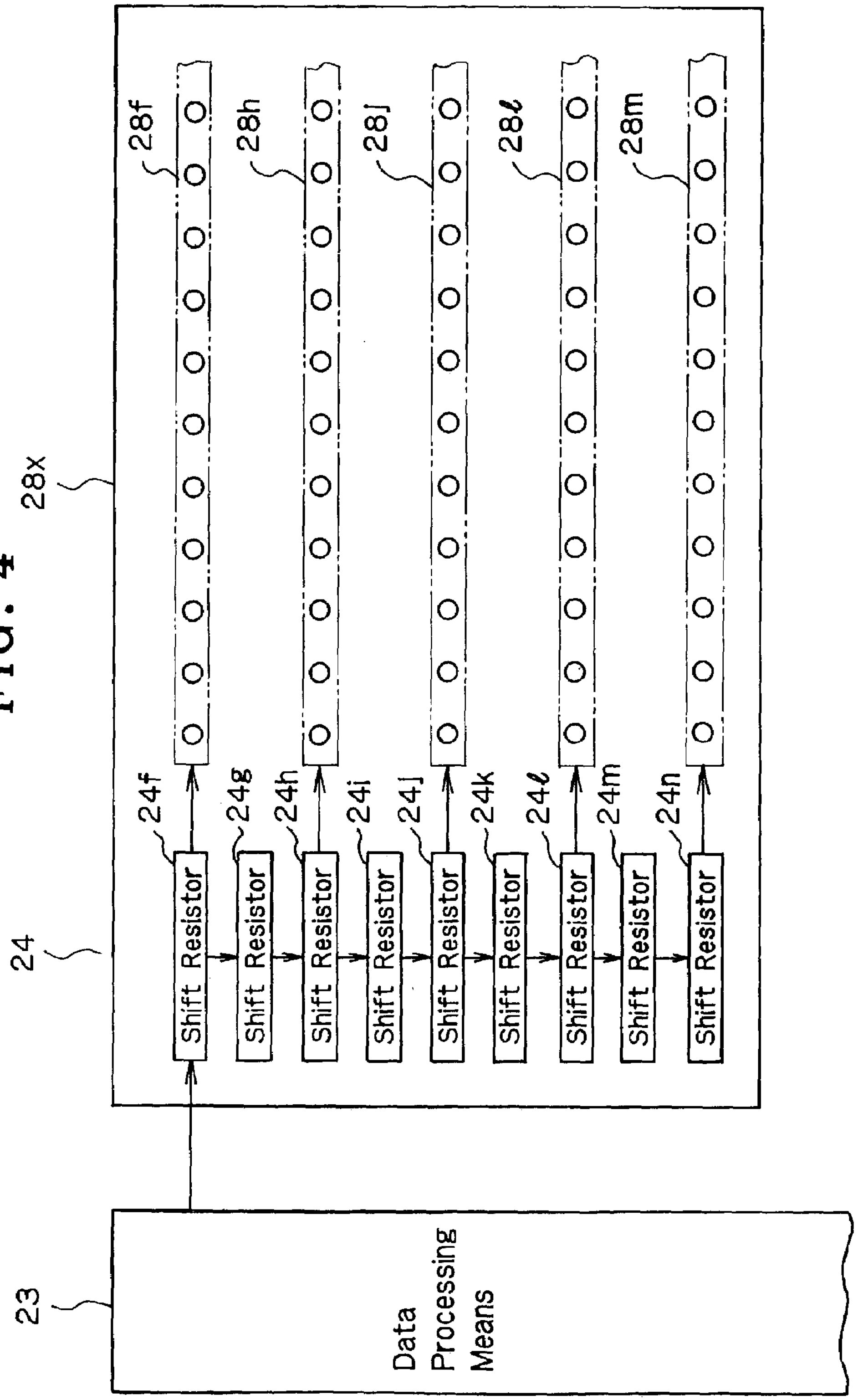
FIG. 4 is a block diagram showing a control unit of the image forming apparatus.

FIG. 4 is a block diagram corresponding to FIG. 3. In the example of FIG. 4, a storage means 24 and a line head 28X are formed on a same substrate. Description will be made as regard to the light-emitting element line heads 28X for yellow. The spot positions 33 shown in FIG. 3 are formed by lines 28f-28n on which light emitting elements are aligned. Positions where no line of light emitting elements is formed in the line head 28X of FIG. 4 correspond to the positions where no pixel is exposed shown in FIG. 3. The storage means 24 comprises a first group consisting of shift resistors 24f-24n corresponding to the lines 28f-28n in which the light emitting elements are aligned, respectively. There is a second group consisting of shift resistors 24g-24m each of which is arranged between each pair of adjacent shift resistors among the aforementioned shift resistors 24f-24n. The shift resistors 24g-24m of the second group operates only for transmission of image data to the next shift resistor without outputting the image data to light emitting elements.

In the example of FIG. 3 and FIG. 4, the operation for exposing pixels at the spot positions 33a in lines on the image carrier will be described. The image data is outputted from the shift resistor 24*f* to the first line 28*f* of light emitting elements, whereby pixels on the image carrier are exposed. At the moment that the image carrier is driven to rotate just for the pixel pitch Pb in the sub scanning direction, the image data are transmitted from the shift resistor 24*f* to the shift resistor 24*g*. At this time, the shift resistor 24*g* does not output the image data so that no pixel is exposed. At the moment that the image carrier is further driven to rotate just for the pixel pitch in the sub scanning direction, the image data are transmitted from the shift resistor 24*g* to the shift resistor 24*h*. The shift resistor 24*h* outputs the image data to the light emitting elements of the line 28*h*. The light emitting elements on the line 28*h* emit light to expose the same pixels on the line in the spot positions 33*a*.

In the same manner, the movement of the image carrier, the transmission of the image data to the respective shift resistors, and the output of the image data to the light emitting elements are sequentially conducted, whereby each same pixel is exposed repeatedly. In this case, the gradation control for neutral density can be conducted on the basis of the data prepared by the data processing means 23.

Though the lines conducting exposure to pixels and the lines not conducting exposure to pixels are arranged alternatively every line in the example of FIG. 3, two lines not conducting exposure may be arranged between the lines conducting exposure. That is, the exposure to pixels is conducted on every third line. In this case, shift resistors in two lines (arranged vertically nearby) are shift resistors which transmit image data without outputting the image data to the corresponding lines and a shift resistor in the next (third) line conducts the control of light emitting elements. In this manner, the present invention can provide a variety of image formation on the image carrier.

According to the present invention, even when the interval in the sub scanning direction between the spot positions where the light emitting elements emit light to the image carrier is an integral multiple of the pixel pitch in the sub scanning direction, the multiple exposure of each pixel can be achieved by arranging the respective shift resistors to correspond to the line with light emitting elements and line without light emitting elements as shown in FIG. 3 and FIG. 4. In this case, the timing for transmitting image data stored in a shift resistor to the next shift resistor and the timing for making light emitting elements in the line to emit light on the basis on the image data stored in the shift resistor are synchronized, thereby simplifying the circuit structure and speeding up the operation.

Though the spot position pitch in the sub scanning direction is twice as the pixel pitch in the example of FIG. 3, the spot position pitch may he other integral multiple of the pixel pitch. Therefore, the spot position pitch may be the same as the pixel pitch. In this case, the multiple number is 1.

Figure 5:
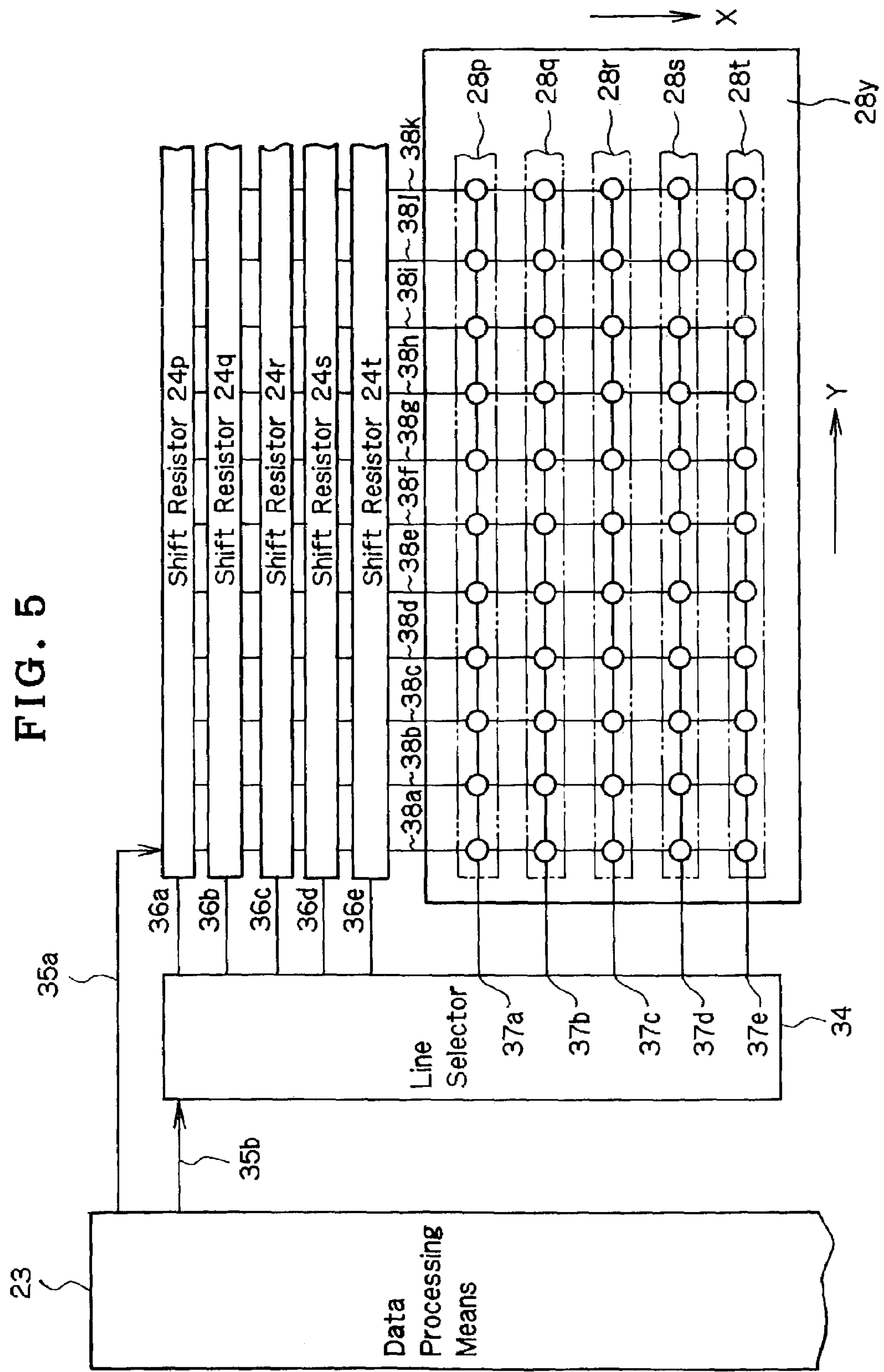
FIG. 5 is a block diagram showing a control unit of an image forming apparatus according to another embodiment of the present invention.

FIG. 5 is a block diagram showing an image forming apparatus according to another embodiment of the present invention. The example shown in FIG. 5 is an apparatus in which light emitting elements are driven in the active matrix method. In FIG. 5, "Z" indicates each single light emitting part composed of a light emitting element and a driving circuit arranged according to the active matrix method. Five lines of light emitting elements 28*p*-28*t* are arranged in a line head 28Y. Corresponding to the light emitting elements 28*p*-28*t* of the respective lines, shift resistors 24*p*-24*t* are arranged. Connected to a data processing device 23 is a line selector 34.

"35*a*" designates a supply line of image data from the data processing device 23 to the shift resistors, "35*b*" designates a control line connecting the data processing device 23 and the line selector 34, "36*a*-36*e*" designate command lines for commanding action from the line selector 34 to the respective shift resistors 24*p*-24*t*, "37*a*-37*e*" designate scanning lines for supplying signals from the line selector 34 to the light emitting elements of the respective lines, and "38*a*-38*k*" designate signal lines for supplying operational signals from the shift resistors 24*p*-24*t* to individual light emitting elements (organic ELs) in each line.

Description will now be made as regard to the operation of FIG. 5. According to a control signal supplied from the data processing device 23 through the control line 35*b*, the line selector 34 selects a scanning line 37*a* and send a signal to the line of light emitting elements 28*p*. In addition, the line selector 34 activates the shift resistor 24*p* according to the signal through the command line 36*a*. The shift resistor 24*p* activates the signal lines 38*a*-38*k* to send output signals of image data to all of the light emitting elements 28*p* in the line. The light emitting elements 28*p* in the line emit lights to expose pixels. By changing the scanning line 37 and the command line 36 according to the signal from the line selector 34, the above actions are also conducted for the light emitting elements 28*q*, 28*r*, 28*s*, and 28*t*, whereby the light emitting elements in all lines are activated to emit light to expose the pixels.

Then, the image data in the shift resistor 24*s* is transmitted to the shift resistor 24*t*. In the same manner, the image data is sequentially transmitted from the shift resistor 24*r* to the shift resistor 24*s*, from the shift resistor 24*q* to the shift resistor 24*r*, and the shift resistor 24*p* to the shift resistor 24*q*. To the shift resistor 24*p*, image data is transmitted from the data processing means 23 through the signal line 35*a*. During this, the image carrier is moved for the pixel pitch.

Since the light emitting elements at the light emitting parts Z remain to emit light because of the function of the active matrix, the light emitting elements do not lights out even during the transmission of image data between the shift resistors, thereby exposing pixels with high luminance. By repeating the outputting of image data from the shift resistor 24 to the light emitting elements, the transmission of the image data between the shift resistors, and the movement of the image carrier, thereby consecutively writing the image data onto the image carrier.

Figure 6:
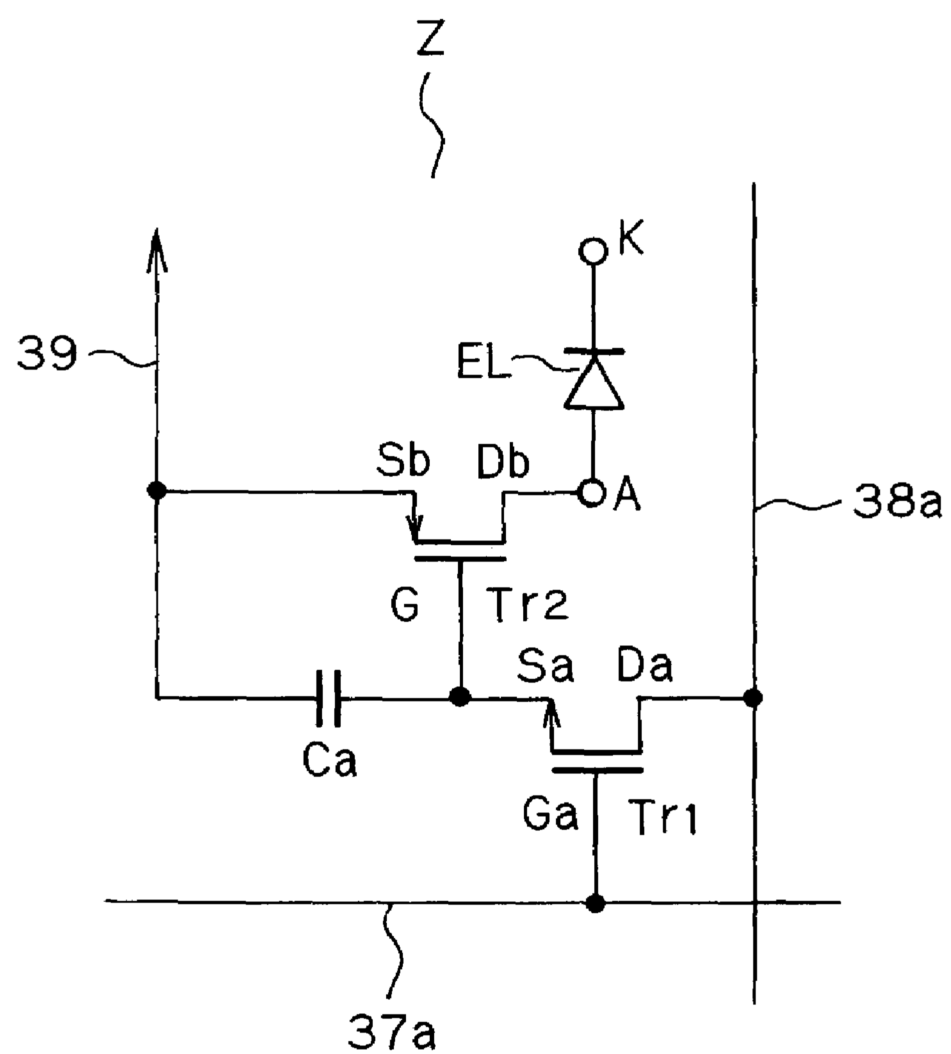
FIG. 6 is a circuit diagram showing a control circuit for light emitting elements to be driven by active matrix method.

FIG. 6 is a circuit diagram for operating the light emitting parts Z according to the active matrix. In FIG. 6, an organic EL is employed as each light emitting element, "K" designates a cathode terminal thereof and "A" designates an anode terminal. The cathode terminal K is connected to a power source which is not shown. "37*a*" designates a scanning line which is connected to a gate Ga of a switching TFT (Tr1). "38*a*" designates a signal line which is connected to a drain Da of the switching TFT. "39" designates a power line and "Ca" designates a storage capacitor. A source Sb of a driving TFT (Tr2) of the organic EL is connected to the power line 39 and a drain Db is connected to the anode terminal A of the organic EL. In addition, a gate Gb of the driving TFT is connected to a source Sa of the switching TFT.

Description will now be made as regard to the operation of the circuit shown in FIG. 6. As the signal line 38*a* is energized in a state that a voltage of the power line 39 is applied to the source of the switching TFT, the switching TFT is turn ON. Accordingly, the gate voltage of the driving TFT is lowered and the voltage of the power line 39 is supplied from the source of the driving TFT so that the driving TFT becomes to the conducting state. As a result, the organic EL is activated to emit light of a predetermined luminance. In addition, the storage capacitor Ca is charged by the voltage of the power line 39.

Even when the switching TFT is turned OFF, the driving TFT is still in the conducting state according to the charge stored in the storage capacitor Ca so that the organic EL remains to emit light. Therefore, by adopting the active matrix to the driving circuit for the light emitting elements, the operation of the organic EL is maintained to keep emitting light even when the switching TFT is turned OFF for transmitting the image data between the shift resistors, thereby exposing pixels with high luminance.

Figures 7, 9:
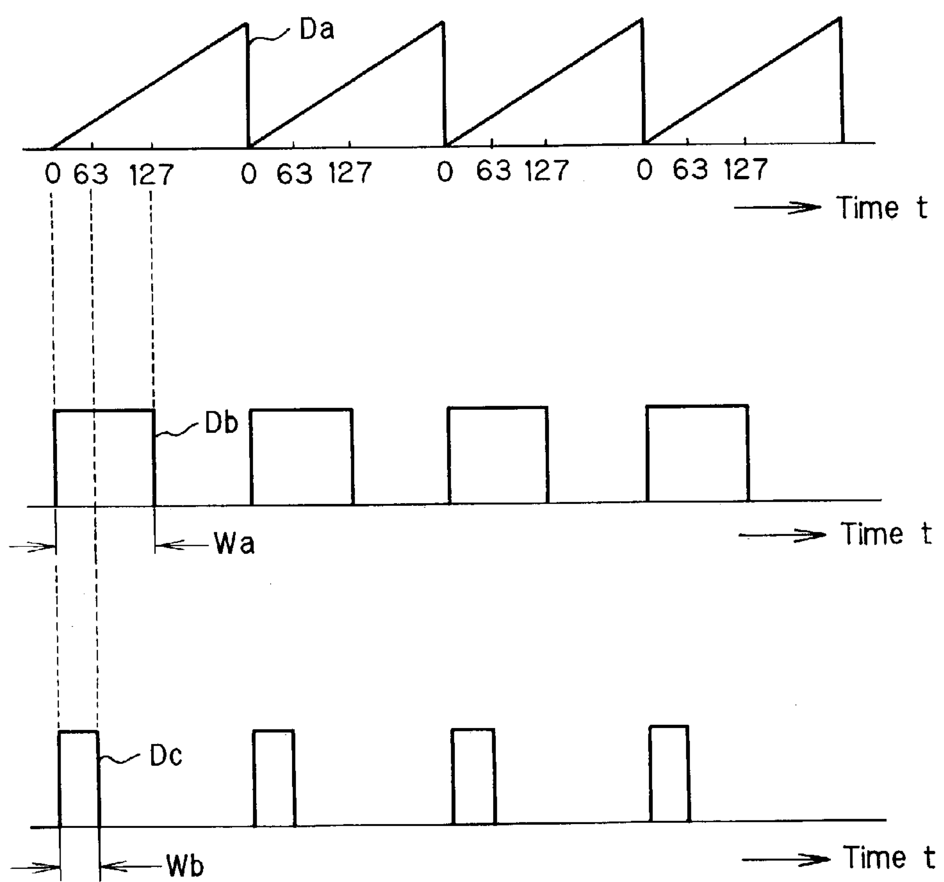
FIG. 7 is a table for explanation of an example of the relation between bit data and gradation data.
FIG. 9 is an explanatory diagram of an example in which the light emitting elements are controlled by the PWM method.

In the present invention, by controlling the light emitting elements in the pulse-width modulation (PWM) method to control the amount of emitting light. By the control according to the PWM method, the gradation control for the light emitting elements can be achieved. In the present invention, gradation data is formed by an 8-bit gradation data memory. FIG. 7 is a table for explanation of an example of the relation between bit data and gradation data. In the example of FIG. 7, the bit data No. 1 is a gradation data 0 (no light emission), the bit data No. 8 is a data of the most condensed density, and the bit data No. 2-No. 7 are data of neutral densities therebetween.

Figure 8:
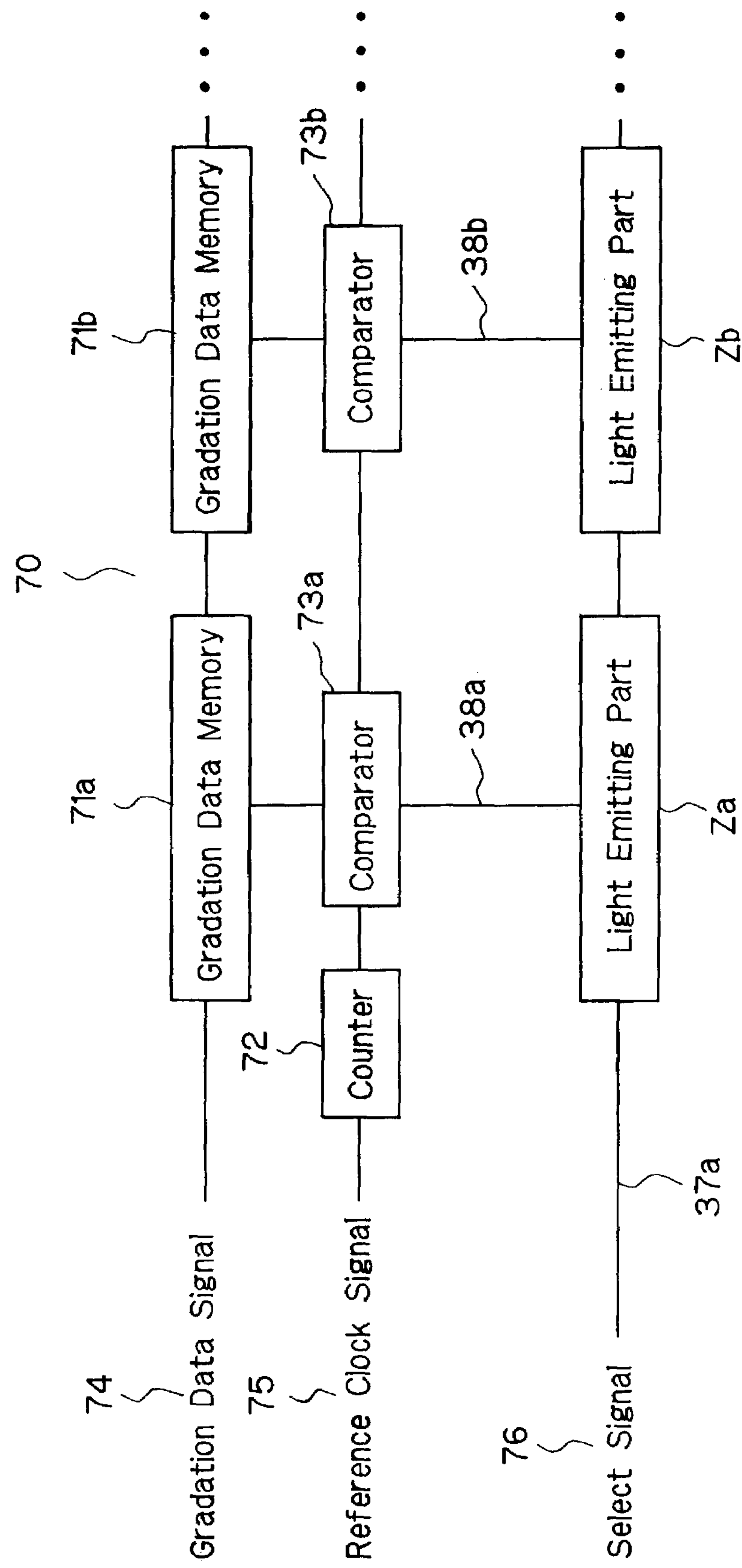
FIG. 8 is a block diagram of an example in which light emitting elements are controlled by the pulse-width modulation (PWM) method.

FIG. 8 is a block diagram of an example for conducting PWM control. In FIG. 8, a PWM control unit 70 is provided with gradation data memories 71*a*, 71*b* . . . which may comprise shift resistors, a counter 72, comparators 73*a*, 73*b* . . . , and light emitting parts Za, Zb . . . . Supplied to the gradation data memories 71*a*, 71*b* . . . is a gradation data signal 74 from, for example, the data processing means 23 shown in FIG. 7. The gradation data memories 71*a*, 71*b* . . . are 8-bit memories as shown in FIG. 7. The counter 72 counts reference clock signal 75.

The bit number of the counter 72 is eight bit the same as that of the gradation data memories 71*a*, 71*b* . . . so that the count repeats 0→ the maximum (255)→0→ the maximum. The comparators 73*a*, 73*b* compare the signal of the counter 72 to the gradation data stored in the gradation data memories 71*a*, 71*b* . . . . When the gradation data>the counter value, the switching TFT is turned OFF as shown in FIG. 6. When the gradation data≦the counter value, the switching TFT is turned OFF.

FIG. 9 shows a characteristic graph showing a concrete example of the PWM control shown in the block diagram of FIG. 8. The top graph of FIG. 9 shows the output Da of the counter 72 which repeats 0→ the maximum (255)→0→ the maximum . . . as described in the above. The middle graph of FIG. 9 shows the waveform Db of the signal outputted from the comparator, i.e. the operating characteristics of the switching TFT, when the gradation data is the bit data No. 7 (128 gradation level). In this case, the switching TFT is turned ON when the output of the counter is in a range from 0 to 127, and the switching TFT is turned OFF when the output of the counter is 128 and 255.

The bottom graph of FIG. 9 shows the waveform Dc of the signal outputted from the comparator, i.e. the operating characteristics of the switching TFT, when the gradation data is the bit data No. 6 (64 gradation level). In this case, the switching TFT is turned on when the output of the counter is in a range from 0 to 63, and the switching TFT is turned OFF when the output of the counter is 64 and 255. In case of the middle graph of FIG. 9, the pulse width of the waveform Db is Wa. In case of the middle graph of FIG. 9, the pulse width of the waveform Dc is Wb. That is, according to the size of the gradation data, the time period for which the switching TFT is turned ON is changed, thereby changing the amount of light emitted from the light emitting elements. Since the amount of exposure to the image carrier can be changed by ON/OFF of the light emitting elements according to the ON/OFF control of the switching TFT, the circuit structure can be simplified.

Figure 10:
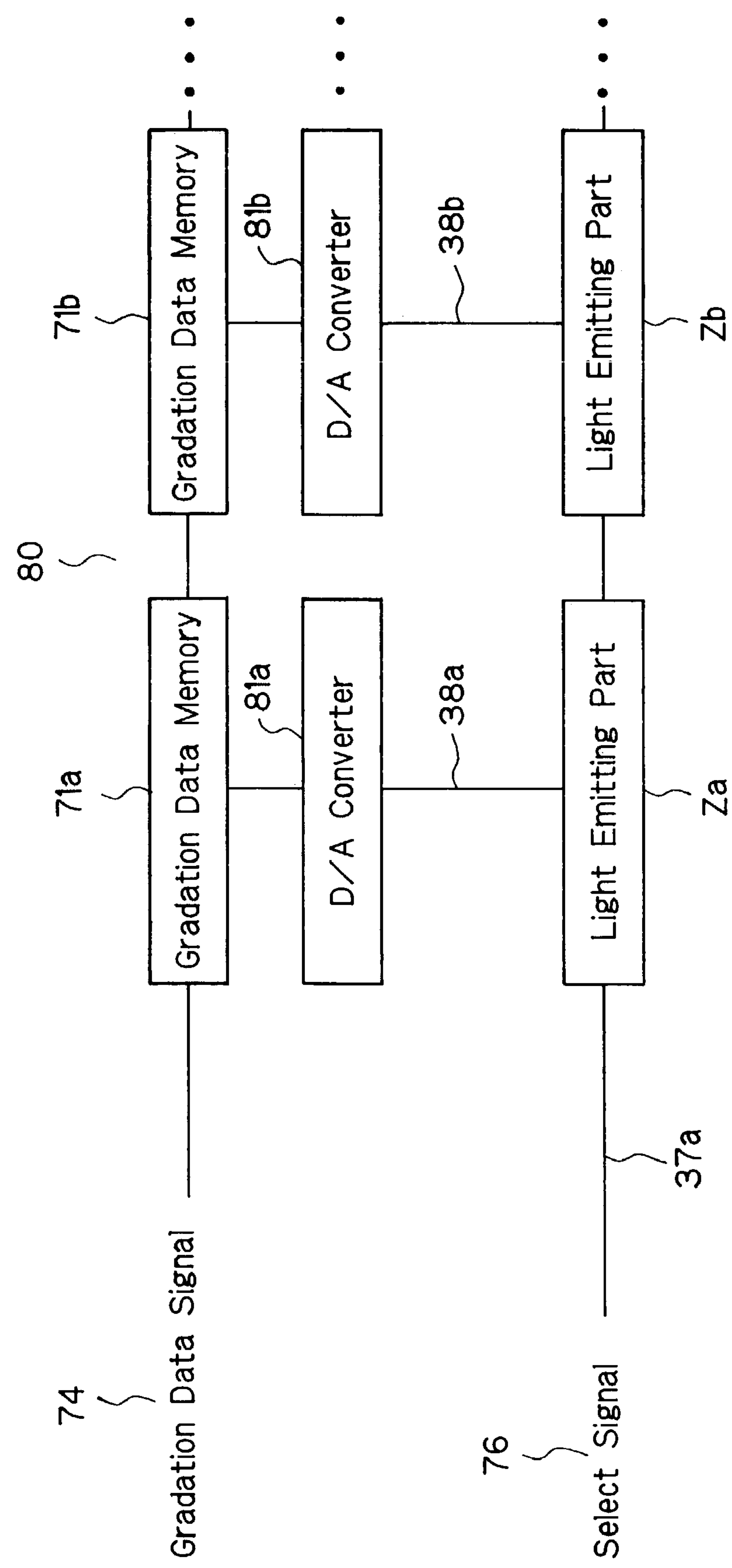
FIG. 10 is a block diagram of an example in which the light emitting elements are controlled by the intensity modulation method.

FIG. 10 is a block diagram showing another structure according to the present invention. The same pats as used in FIG. 8 are marked with the same numerals or marks, so the detail description about such parts will be omitted. The example shown in FIG. 10 controls the switching TFT with voltages or currents corresponding to the sizes of the gradation data. Such control as shown in FIG. 10 is called "Intensity Modulation" in the present invention. In an intensity modulation control unit 80 shown in FIG. 10, D/A converters 81*a*, 81*b* . . . are connected to the gradation data memories 71*a*, 71*b* . . . , respectively. The D/A converters 81*a*, 81*b* . . . form voltage values of analog or current values corresponding to the sizes of the gradation data stored in the gradation data memories 71*a*, 71*b* . . . and output the voltage values or current values to the switching TFTs, respectively.

In the example of FIG. 10, the amount of light emitted from the light emitting elements is changed by changing the bias of the switching TFT corresponding to the gradation data. Therefore, it is not required to control the ON/OFF of the light emitting elements at a high speed. Even when the speed of response of the light emitting elements is slow, the amount of exposure to the image carrier can be changed at a high speed. Light emitting parts Za, Zb . . . are driven in the active matrix method shown in FIG. 6. Supplied to the light emitting parts Za, Zb . . . are a select signal through a scanning line 37*a* and control signals through emission control data lines 38*a*, 38*b*. . . .

By the way, in arranging plural light emitting elements in each line in the image forming apparatus, it is structurally impossible to arrange adjacent light emitting elements with no space therebetween. When light emitting elements are arranged to correspond to the line 33*a* of the spot positions in FIG. 4 for example, spaces are created between adjacent light emitting elements. Because of these spaces, the resolution is reduced and defect of transferred toner occurs when the image data is recorded on a recording medium, leading to deterioration in quality. To avoid this, the light emitting elements are arranged in a zigzag fashion in the sub scanning direction of the image carrier.

Figure 11:
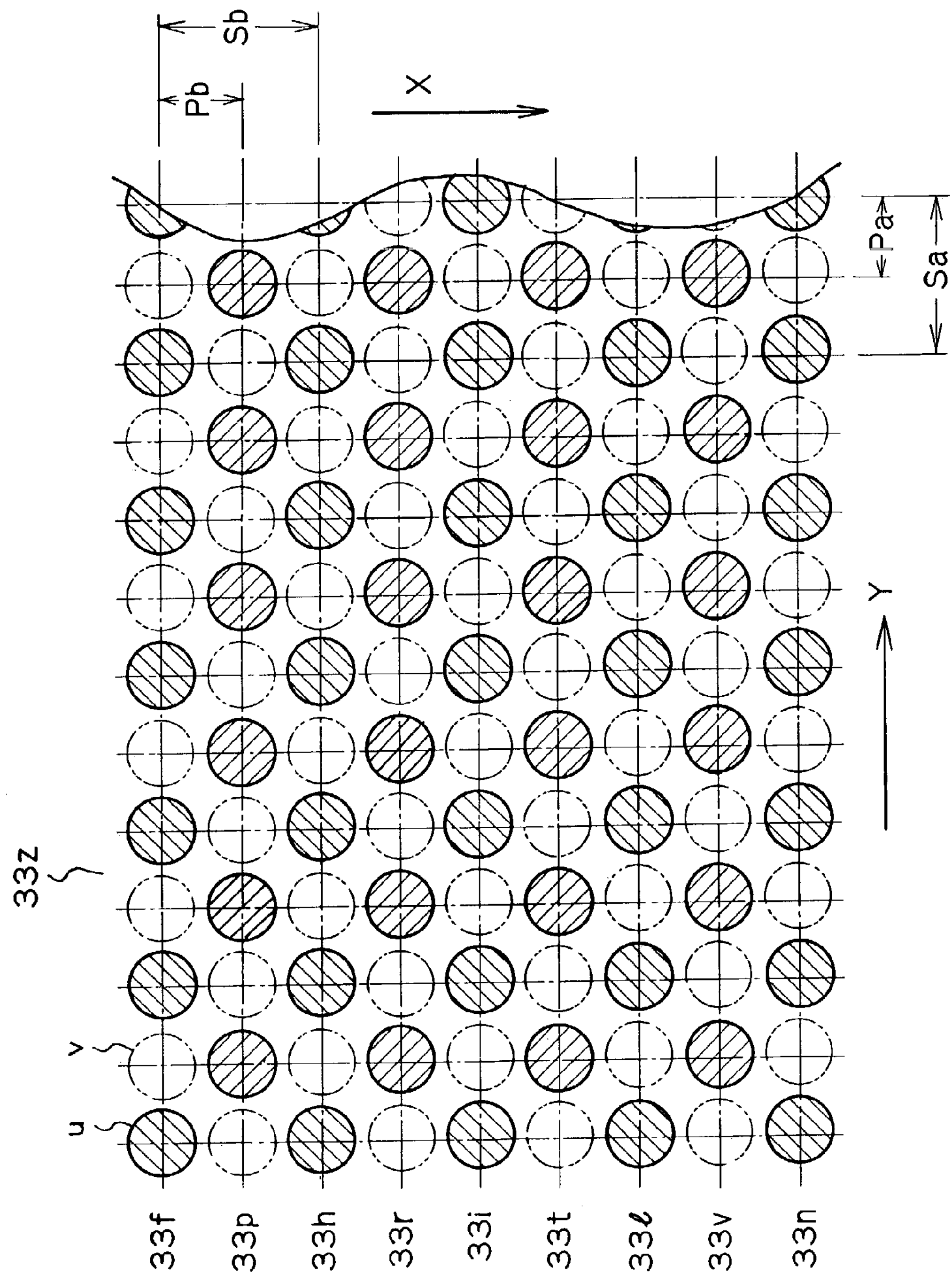
FIG. 11 is an explanatory diagram showing an image forming apparatus according to another embodiment of the present invention.

FIG. 11 is an explanatory diagram showing an example of spot positions 33Z formed on the image carrier by light emitting elements in case of an optical head in which the light emitting elements are arranged in a zigzag fashion. In FIG. 11, hatched portions U are pixels to be exposed to light from the light emitting elements. Portions V indicated by chain double-dashed lines are pixels not to be exposed to light from the light emitting elements. "Pa" indicates a pixel pitch in the main scanning direction and "Pb" indicates a pixel pitch in the sub scanning direction. "Sa" indicates a spot position pitch in the main scanning direction and "Sb" indicates a spot position pitch in the sub scanning direction.

In the example of FIG. 11, either the pixel pitch Pa in the main scanning direction and the pixel pitch Pb in the sub scanning direction is half of the spot position pitch. That is, the interval in the sub scanning direction between spot positions to be formed on the image carrier by the light emitting elements is set to be twice of the pixel pitch in the sub scanning direction. The lines of spot positions are divided into two groups: the first group 33*f*, 33*h*, 33*j*, 33*l*, 33*n* and the second group 33*p*, 33*r*, 33*t*, 33*v*. In the first group and the second group, the positions of light emitting elements, i.e. pixels to be exposed and pixels not to be exposed are alternatively arranged as seen in the main scanning direction.

Figure 12:
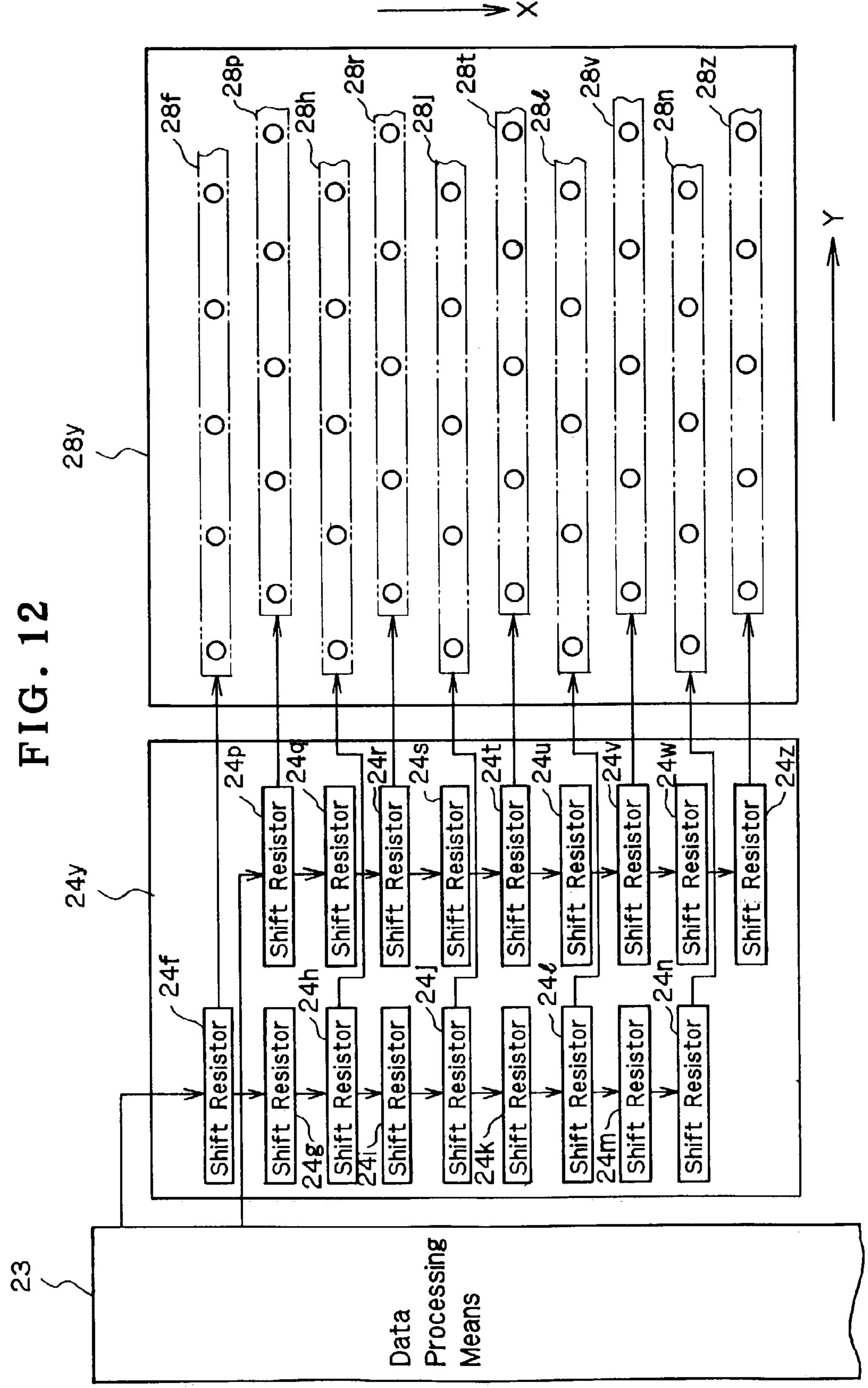
FIG. 12 is a block diagram showing a control unit according to an another image forming apparatus of the present invention.

FIG. 12 is a schematic block diagram of the driving of the light emitting elements, corresponding to FIG. 11. Description will be made as regard to the light-emitting element line heads 28Y for yellow. The shift resistors are divided into two groups: the first group 24*f*-24*n* and the second group 24*p*-24*z*. Among the shift resistors in the first group, each of the shift resistors 24*f*, 24*h*, 24*j*, and 24*l* holds the image data, outputs the image data to the light emitting elements, and transmits the image data to the next shift resistor. The shift resistor 24*n* holds the image data and the outputs the image data to the light emitting elements. Each of the shift resistors 24*g*, 24*i*, 24*k*, and 24*m* of the first group holds the image data and transmits the image data to the next shift resistor without outputting the image data to the light emitting elements.

Among the shift resistors of the second group, each of the shift resistors 24*p*, 24*r*, 24*t*, and 24*v* holds the image data, outputs the image data to the light emitting elements, and transmits the image data to the next shift resistor. The shift resistor 24*z* holds the image data and the outputs the image data to the light emitting elements. Each of the shift resistors 24*q*, 24*s*, 24*u*, and 24*w* hold the image data and transmit the image data to the next shift resistor without outputting the image data to the light emitting elements.

In FIG. 12, the lines of the light emitting elements are divided into two groups: the first group 28*f*, 28*h*, 28*j*, 28*l*, 28*n* and the second group 28*p*, 28*r*, 28*t*, 28*v*, 28*z*. The lines of the fist group are arranged to correspond to the spot positions of the first group shown in FIG. 11. In addition, the lines of the second group are arranged to correspond to the spot positions of the second group of FIG. 11.

Description will now be made as regard to the operation of the block diagram shown in FIG. 12. The data processing means 23 outputs image data to the shift resistors of the first group through a control line 35*p*, and outputs the image data to the shift resistors of the second group through a control line 35*q*. The image data is outputted from the shift resistor 24*f* to the light emitting elements of the first line 28*f* of the first group so that the light emitting elements expose pixels at the spot positions 33*f* on the image carrier. In addition, the image data is outputted from the shift resistor 24*p* to the light emitting elements of the first line 28*p* of the second group so that the light emitting elements expose pixels at the spot positions 33*p* on the image carrier.

As the image carrier moves for the pixel pitch pb in the sub scanning direction, the image data is transmitted from the shift resistor 24*f* to the shift resistor 24*g* of the first group. In addition, the image data is transmitted from the shift resistor 24*p* to the shift resistor 24*q* of the second group. At this time, the shift resistor 24*g* and the shift resistor 24*q* do not output the image data to the light emitting elements so that no pixel is exposed. As the image carrier further moves for the pixel pitch Pb in the sub scanning direction, the image data is transmitted from the shift resistor 24*g* to the shift resistor 24*h*. In addition, the image data is transmitted from the shift resistor 24*q* to the shift resistor 24*r*. Then, the shift resistor 24*h* and the shift resistor 24*r* output the image data to the lines 28*h* and 28*r* of the light emitting elements, respectively. Accordingly, the same pixels in the lines at the spot positions 33*f* and 33*p* are exposed to light.

After that, in the same manner, the movement of the image carrier, the transmission of the image data to the respective shift resistors, and the output of the image data to the light emitting elements are sequentially conducted, thereby conducting multiple exposure of each same pixel. In this case, the gradation control for neutral density can be conducted on the basis of the data prepared by the data processing means 23.

Even when the light emitting elements are arranged in the zigzag fashion so that the interval in the sub scanning direction between the spot positions where the light emitting elements emit light to the image carrier is an integral multiple of the pixel pitch in the sub scanning direction, the multiple exposure of each pixel can be achieved by arranging the respective shift resistors which transmit the image data without outputting the image data as shown in FIG. 11 and FIG. 12.

As mentioned above, also in the optical head in which light emitting elements are arranged in a zigzag fashion, the storage means for pixel lines and the lines light emitting elements can be arranged in one-on-one relationship. The timing for transmitting image data stored in a shift resistor to the next shift resistor and the timing for making light emitting elements in the line to emit light on the basis on the image data stored in the shift resistor are synchronized, thereby simplifying the circuit structure and speeding up the operation.

Figure 14:
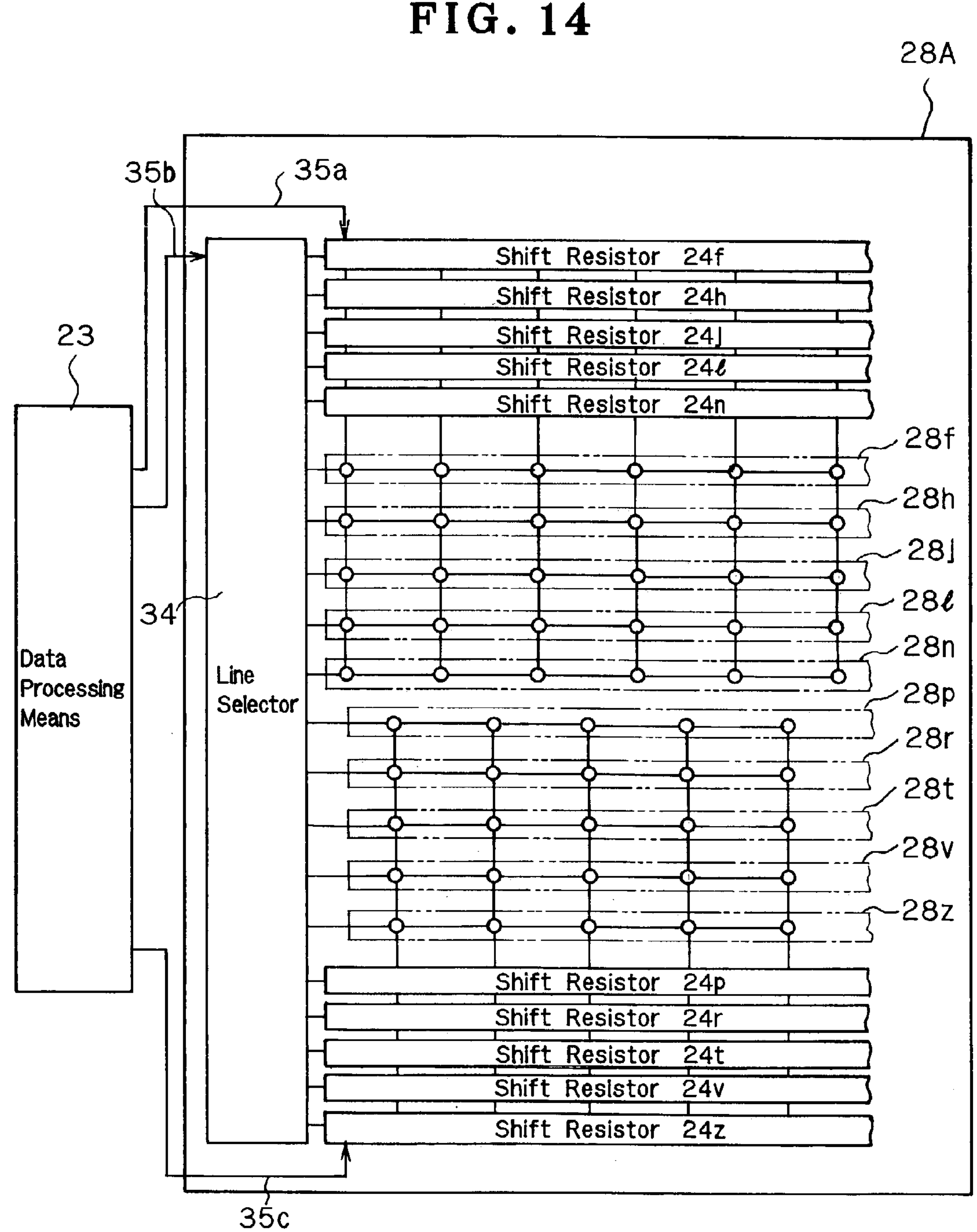
FIG. 14 is a block diagram showing a control unit according to an another image forming apparatus of the present invention.

The driving circuit of the active matrix method and the PWM control, and intensity modulation control as described with reference to FIG. 5-FIG. 10 can be adopted to the case that the light emitting elements are arranged in the zigzag fashion as described above with reference to FIG. 11 and FIG. 12. FIG. 14 is a block diagram showing an example in which light emitting elements are arranged in a zigzag fashion as shown in FIG. 11 and are controlled by the active matrix method as described with reference to FIG. 5. In this example, in addition to storage means (shift resistors 24*f*-24*z*) and lines of light emitting elements 28*f*-28*z*, a line selector 34 is mounted on a line head 28A. "35*c*" designates a control line for outputting image data from the data processing means 23 to the shift resistors 24*p*-24*z* of the second group.

In FIG. 14, the line selector 34 and the shift resistors 24*f*-24*n* control and drive light emitting parts arranged in the lines 28*h*-28*n* according to the active matrix method as mentioned above. In addition, the line selector 34 and the shift resistors 24*p*-24*z* control and drive light emitting parts arranged in the lines 28*p*-28*z* according to the active matrix method. As shown in FIG. 14, since the driving control according to the active matrix method can be applied even when the lines of light emitting elements are arranged in the zigzag fashion in the sub scanning direction of the image carrier, the light emitting elements can be maintained to emit light even during the image data is transmitted between the shift resistors, thereby exposing pixels with high luminance.

Figure 13:
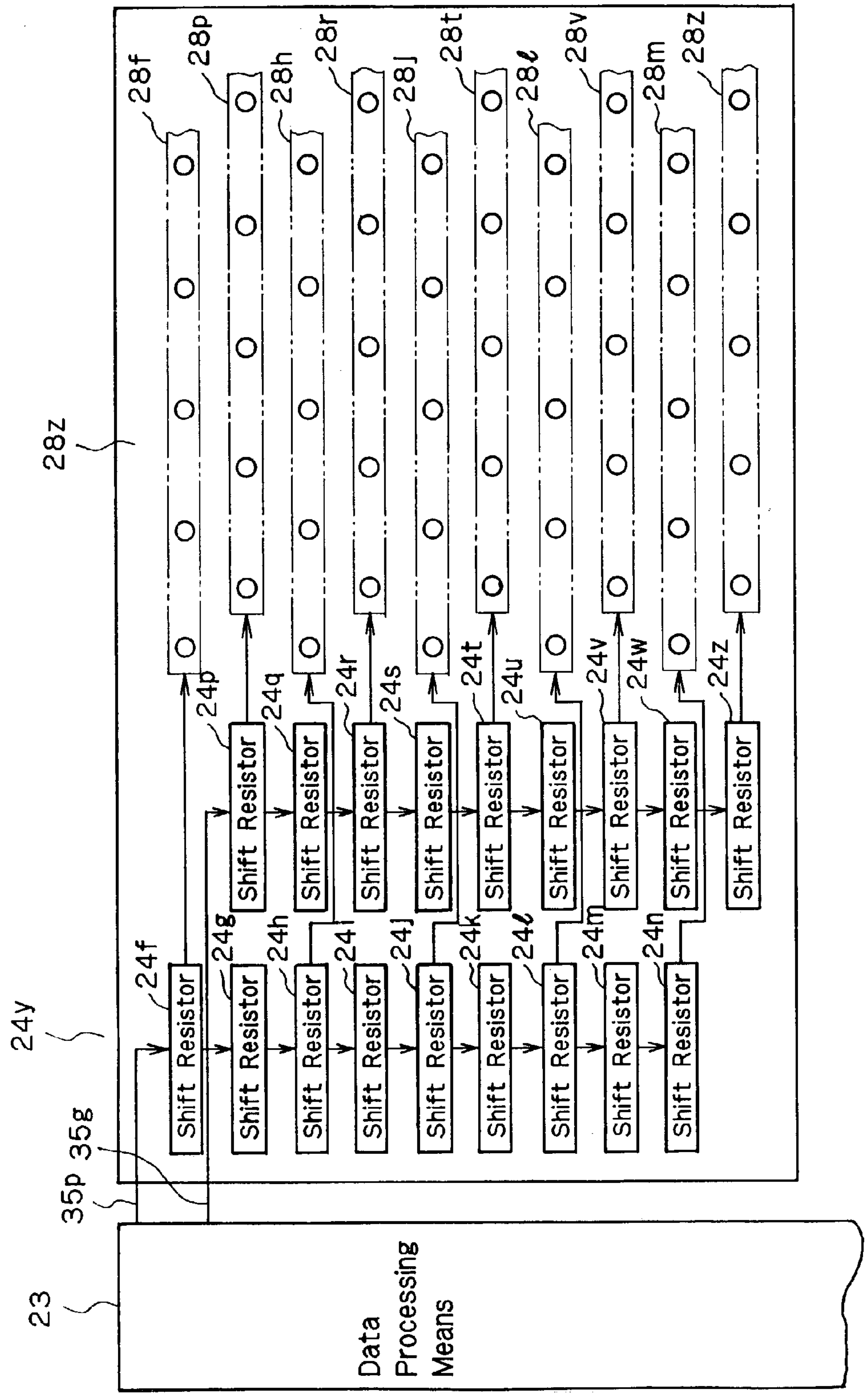
FIG. 13 is a block diagram showing a control unit according to an another image forming apparatus of the present invention.

In the structure shown in FIG. 12, the shift resistors 24*f*-24*z* are formed separately from the lines of light emitting elements 28*f*-28*z*. However, in the present invention, the shift resistors 24*f*-24*z* may be formed on a same substrate as the lines of light emitting elements 28*f*-28*z* as shown in the block diagram of FIG. 13. In this case, the light emitting elements and the storage means can be manufactured together. The necessity of preparing the light emitting elements and the storage means on separate chips can be eliminated, thereby reducing the manufacturing cost.

Further, in the structure shown FIG. 12, a glass is used as the aforementioned substrate so that the storage means are composed of Thin Film Transistors (TFTs). There are various methods of making the TFT. For example, silicon oxide is first deposited into a layer on a glass substrate and amorphous silicon is then deposited into a layer thereon. The amorphous silicon layer is exposed to excimer laser beam for crystallization, thus forming a polysilicon layer as a channel. After patterning the polysilicon layer, a gate insulating layer is formed and further a gate electrode is formed of tantalum nitride. Subsequently, source/drain regions for N-channel TFT are formed by ion implantation of phosphorous and source/drain regions for P-channel TFT are formed by ion implantation of boron.

After impurities of ion implantation is activated, a first layer insulating film is formed, first contact holes are formed, source lines are formed, a second layer insulating film is formed, second contact holes are formed and metallic pixel electrodes are formed, thereby completing the array of TFT (for example, see "Polymer Organic EL Display" presented at the 8$^{th}$ Electronic Display Forum (Apr. 18, 2001)). The metallic pixel electrode is made of metal such as Mg, Ag, Al, and Li and functions as a cathode for the organic EL emitter and also as a reflection layer for the organic EL emitter.

Since the glass substrate having high dimensional stability is structured and all of light emitting elements and storage elements are formed on the single substrate, improvement in accuracy of aiming light from each light emitting element to each pixel on the image carrier is achieved.

Figure 15:
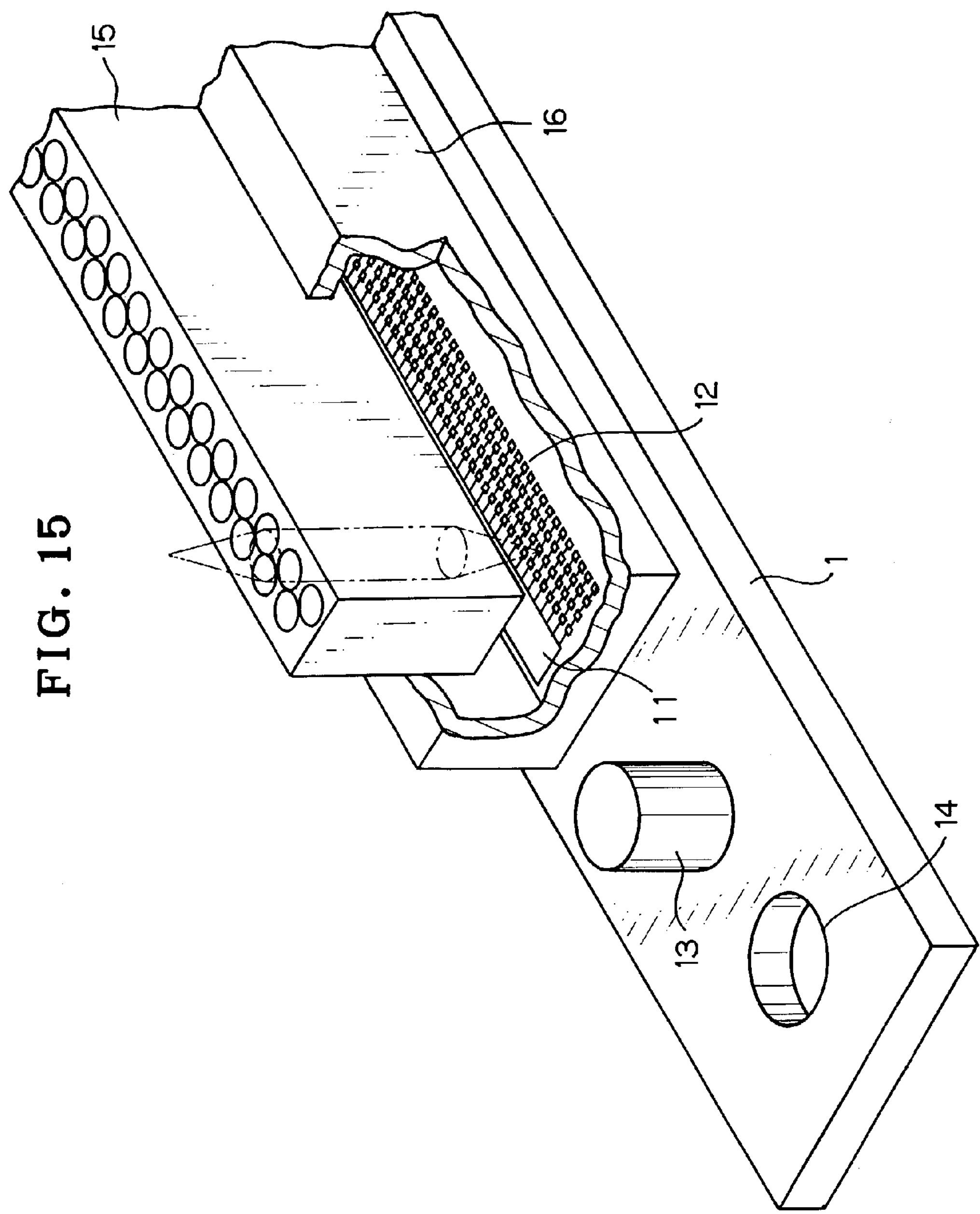
FIG. 15 is a perspective view showing an example of organic EL arrays according to an embodiment of the present invention.

In the present invention, organic EL (organic electroluminescence) arrays are employed in lines of light emitting elements for multiple exposure. FIG. 15 is a perspective view showing an example of the organic EL array to be employed in the image forming apparatus of the present invention. In FIG. 15, an organic EL array 12 is mounted on a rectangular substrate 1 made of glass or the like. The organic ELs are connected to a driving circuit 11 for controlling the emission. The rectangular substrate 1 is provided with positioning pins 13 and screw holes 14 for installation formed on both sides thereof. "16" designates a protective cover for covering the driving circuit 11 and the organic EL array 12. A condensing rod lens array 15 as magnifying optical system is fixed on the side of the image carrier. Because of the condensing function of the condensing rod lens array 15, light-emitting parts of the organic EL array 12 are condensed to form an image on a photosensitive surface of the image carrier.

Figure 16:
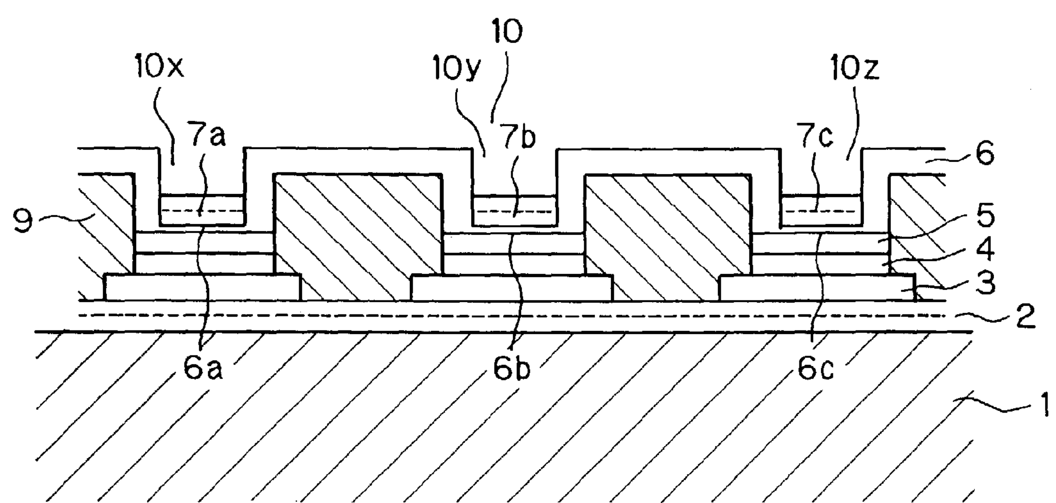
FIG. 16 is a sectional view showing the schematic structure of the organic EL arrays.

FIG. 16 is a vertical sectional view showing an example of an organic EL array head 10. In FIG. 16, a reflection layer 2 composed of dielectric multi-layered film is formed on the substrate 1, made of glass or a resin film, by the spattering method. The reflection layer 2 composed of a dielectric multi-layered film may be formed of, for example, a pair of layers made of $SiO_2$ and $TiO_2$. The reflective layer 2 formed of such a dielectric multi-layered film has reflectance of 0.99 or more. An anode 3 is formed on the reflection layer 2 by the spattering method. The anode 3 is made of a light-transmitting and conductive material. As an example of the material having such characteristics, ITO (indium tin oxide) having large working function may be used.

Then, a hole transportation layer 4 is formed on the anode 3 by the inkjet method. After forming the hole transportation layer 4 within a hole 11, ink composition is discharged into the hole 8 from a head of an inkjet printing device, thereby achieving the patterning application on the emitting layer of the pixel. After the application, the solvent is removed and the applied ink composition is treated by heat, thereby forming a light-emitting layer 5.

The organic EL layer composed of the hole transportation layer 4 and the emitting layer 5 may be formed by other known method such as a spin coating method, a dipping method, and other liquid phase deposition method instead of applying ink compositions by inkjet method as the above. The material of the hole transportation layer 4 and the emitting layer 5 may be known EL materials listed in Japanese Patent Unexamined Publication H10-12377 and Japanese Patent Unexamined Publication 2000-323276, so description about details will be omitted. Then, a cathode 6 is formed by vapor deposition method. As the material of the cathode 6, for example, Al may be employed.

The organic EL array head 10 has thin layer portions 6*a*-6*c* formed at the cathodes 6 having a U-like section corresponding to light emitting parts 10*x*-10*z*. The thin layer portions 6*a*-6*c* are formed to have such a thickness in holes of a wall 9 as to allow light transmission. At the light emitting parts 10*x*-10*z*, semi-transparent reflection layers (dielectric mirrors) 7 composed of a plurality of dielectric multi-layered films are formed on the bottoms of the cathodes 6 by the spattering method. The semi-transparent reflection layers 7*a*-7*c* composed of dielectric multi-layered films may be formed of, for example, three pairs of layers made of $SiO_2$ and $TiO_2$. The semi-transparent reflection layers 7 formed of such dielectric multi-layered films has reflectance of about 0.9.

In the embodiment of FIG. 16, as mentioned above, the thin layer portions 6*a*-6*c* are formed at the cathodes 6, thereby allowing light transmittance. Accordingly, even when the organic EL layer composed of the hole transportation layer 4 and the emitting layer 5 is formed by a liquid phase deposition method such as the inkjet method, it is free from the problem that the reflectance is reduced due to the smoothness of contact portion between the EL layer and the cathode.

In the present invention, the organic EL array head having the aforementioned structure can be used as an exposure head of an image forming apparatus, for example, capable of forming a color image by using electrophotographic technique.

Figure 17:
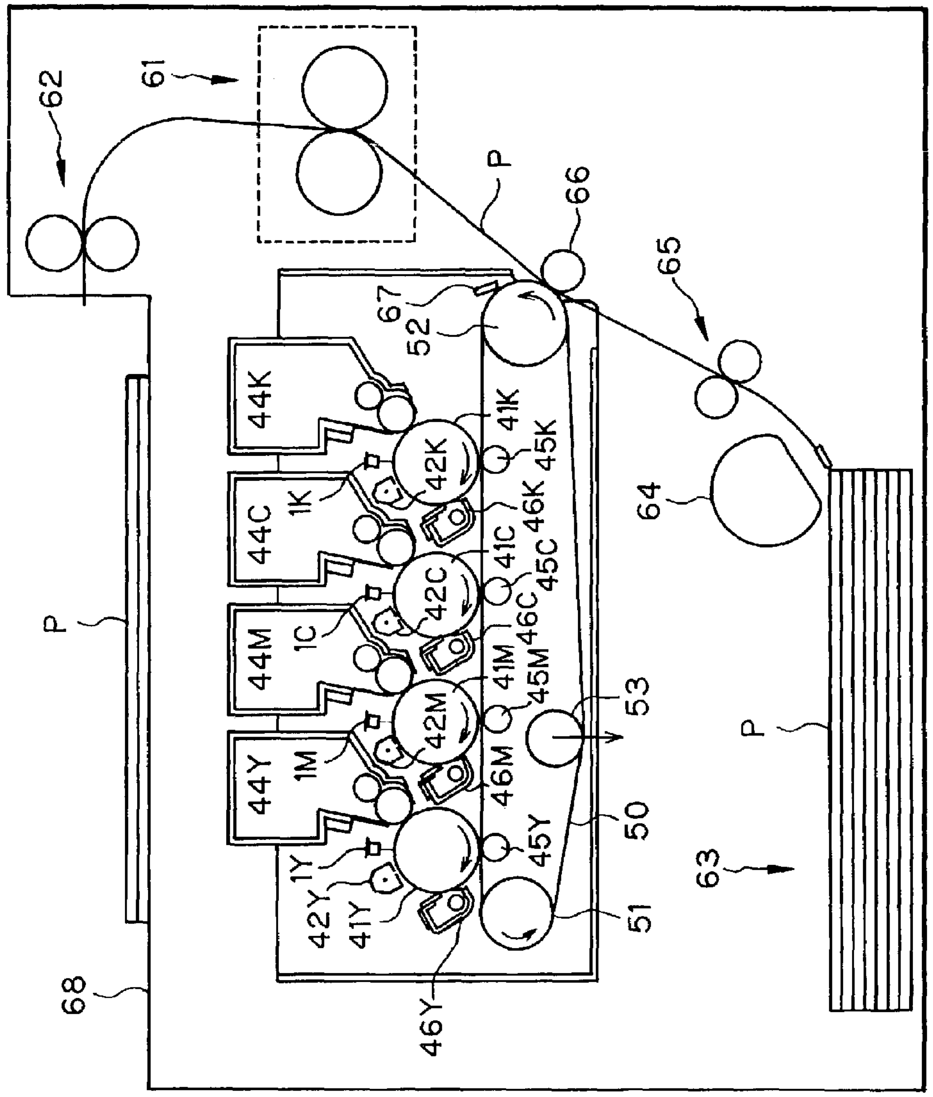
FIG. 17 is a front view showing the schematic structure of an image forming apparatus of a tandem type in which the organic EL array head of the present invention is arranged.

FIG. 17 is a front view schematically showing an example of an image forming apparatus employing the organic EL array head described with reference to FIG. 15. The image forming apparatus is of a tandem type in which four similar organic EL array exposure heads 1K, 1C, 1M and 1Y are disposed at the respective exposure positions of four similar photosensitive drums (image carriers) 41K, 41C, 41M and 41Y corresponding thereto. As shown in FIG. 17, the image forming apparatus has a driving roller 51, a driven roller 52, and a tension roller 53 and has an intermediate transfer belt 50. The intermediate transfer belt 50 is laid around the driving roller 51 and the driven roller 52 with a certain tension applied by the tension roller 53 and is driven to circulate in the direction of the arrows shown in FIG. 17 (counterclockwise direction) by the driving roller 51. Four photoreceptors 41K, 41C, 41M and 41Y are disposed at predetermined distance along the intermediate transfer belt 50. Each photoreceptor has a photosensitive layer on the outer peripheral surface thereof to serve as an image carrier.

Suffixes "K", "C", "I", and "Y" added to reference numerals indicate black, cyan, magenta, and yellow, respectively. That is, the photoreceptors designated by reference numerals with such suffixes are photoreceptors for black, cyan, magenta, and yellow, respectively. The same is true for other members. The photoreceptors 41K, 41C, 41M and 41Y are driven to rotate in the direction of arrows shown in FIG. 17 (clockwise direction) synchronously with the driving of the intermediate transfer belt 50. Arranged around each photoreceptor 41 (K, C, M, Y) area charging means (corona charger) 42 (K, C, M, Y) for uniformly charging the outer peripheral surface of the photoreceptor 41 (K, C, M, Y), an organic EL array exposure head 1 (K, C, M, Y) having the aforementioned structure of the present invention for sequentially line-scanning the outer peripheral surface of the photoreceptor 41 (K, C, M, Y), which has been uniformly charged by the charging means 42 (K, C, M, Y), synchronously with the rotation of the photoreceptor 41 (K, C, M, Y).

Also arranged around each photoreceptor 41 (K, C, M, Y) are a developing device 44 (K, C, M, Y) for applying toner as a developer to an electrostatic latent image formed by the organic EL array exposure head (K, C, M, Y) to form a visible image (toner image), a primary transfer roller 45 (K, C, M, Y) serving as transfer means for sequentially transferring the toner image developed by the developing device 44 (K, C, M, Y) onto the intermediate transfer belt 50 as a primary transfer target, and a cleaning device 46 (K, C, M, Y) as cleaning means for removing the toner remaining on the surface of the photoreceptor 41 (K, C, M, Y) after the transfer of the toner image.

Each organic EL array exposure head 1 (K, C, M, Y) is installed in such a manner that the array direction of the organic EL array exposure head 1 (K, C, M, Y) is parallel to the bus-bar of the photoreceptor drum 41 (K, C, M, Y). The emission energy peak wavelength of each organic EL array exposure head 1 (K, C, M, Y) and the sensitivity peak wavelength of the photo receptor 41 (K, C, M, Y) are set to be approximately coincident with each other. The developing device 44 (K, C, M, Y) uses an on-magnetic single-component toner as a developer, for example. The single-component developer is conveyed to a development roller through a supply roller, for example, and the thickness of the developer layer adhering to the development roller surface is regulated with a regulating blade. The development roller is brought into contact with or pressed against the photoreceptor 41 (K, C, M, Y) to allow the developer to adhere to the surface of the photoreceptor 41 (K, C, M, Y) according to the electric potential level thereof, thereby developing the electrostatic latent image into a toner image.

Toner images of black, cyan, magenta and yellow formed by unicolor toner image forming stations for the four colors are sequentially primarily transferred on to the intermediate transfer belt 50 by a primary transfer bias voltage applied to the respective primary transfer rollers 45 (K, C, M, and Y), and sequentially superimposed on each other on the intermediate transfer belt 50 to form a full-color toner image, which is then secondarily transferred onto a recording medium "P" such as a paper at a secondary transfer roller 66. The transferred full-color toner image is fixed on the recording medium "P" by passing between a pair of fixing rollers 61 as a fixing device. Then, the recording medium "P" is discharged through a pair of sheet delivery rollers 62 onto an outfeed tray 68 formed on the top of the apparatus body.

In FIG. 17, reference numeral 63 designates a sheet cassette in which a stack of a large number of recording media "P" is held, 64 designates a pickup roller for feeding the recording medium "P" from the sheet cassette 63 one by one, 65 designates a pair of gate rollers for regulating the timing at which each recording medium "P" is supplied to the secondary transfer portion at a secondary transfer roller 66, 66 designates the secondary transfer roller as a secondary transfer means for forming the secondary transfer portion together with the intermediate transfer belt 50, 67 designates a cleaning blade as cleaning means for removing the toner remaining on the surface of the intermediate transfer belt 50 after the secondary transfer. As mentioned above, since the organic EL array is used as the writing means in the image forming apparatus shown in FIG. 17, the apparatus can be manufactured to have smaller size than a case using laser scanning optical system.

Though the optical unit and the image forming apparatus of the present invention have been described with reference to the embodiments disclosed herein, the present invention is not limited thereto and various changes may be made therein.

What we claim is:

1. An optical head comprising:

light emitting elements which are aligned in a plurality of lines, extending in the main scanning direction of an image carrier and being arranged in parallel with each other in the sub scanning direction of the image carrier, so that said light emitting elements are arranged in two-dimensional zigzag fashion; and storage means for storing image data and outputting the image data to said light emitting elements, wherein:

pixels on said image carrier are exposed by the light emitting elements aligned in one line and exposed again by the light emitting elements aligned in the next line after the movement of said image carrier, and in the same manner, said pixels are sequentially exposed by the light emitting elements on another line after the movement of said image carrier so as to achieve multiple exposure of the pixels, pixels are capable of being exposed with gradational outputs, and pixels to be exposed by light emitting elements and pixels not to be exposed by light emitting elements are arranged in the zigzag fashion in said sub scanning direction on said image carrier, and wherein said storage means comprise first storage means each of which outputs image data to light emitting elements in the corresponding line and second storage means each of which transfer the image data to the next first storage means without outputting the image data to the light emitting elements.

* * * * *